(12) United States Patent
Warashina et al.

(10) Patent No.: US 9,253,418 B2
(45) Date of Patent: Feb. 2, 2016

(54) INFRARED IMAGE SENSOR AND SIGNAL READ METHOD

(75) Inventors: Yoshihisa Warashina, Hamamatsu (JP); Jun Suzuki, Tono (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 74 days.

(21) Appl. No.: 14/005,882

(22) PCT Filed: Mar. 9, 2012

(86) PCT No.: PCT/JP2012/056190
§ 371 (c)(1),
(2), (4) Date: Oct. 11, 2013

(87) PCT Pub. No.: WO2012/132845
PCT Pub. Date: Oct. 4, 2012

(65) Prior Publication Data
US 2014/0027642 A1    Jan. 30, 2014

(30) Foreign Application Priority Data
Mar. 25, 2011 (JP) ................................ 2011-067843

(51) Int. Cl.
| G01J 5/00 | (2006.01) |
|---|---|
| G01J 5/10 | (2006.01) |
| H04N 5/33 | (2006.01) |
| G01J 1/44 | (2006.01) |
| G01J 5/22 | (2006.01) |
| H04N 5/217 | (2011.01) |
| G01J 5/24 | (2006.01) |
| G01J 5/06 | (2006.01) |

(Continued)

(52) U.S. Cl.
CPC ... *H04N 5/33* (2013.01); *G01J 1/44* (2013.01); *G01J 5/00* (2013.01); *G01J 5/22* (2013.01); *H04N 5/217* (2013.01); *G01J 5/10* (2013.01); *G01J 5/24* (2013.01); *G01J 2001/444* (2013.01); *G01J 2005/0048* (2013.01); *G01J 2005/0077* (2013.01); *G01J 2005/066* (2013.01); *G01J 2005/202* (2013.01); *H04N 5/357* (2013.01)

(58) Field of Classification Search
CPC ............................. G01J 5/10; G01J 2005/0077
See application file for complete search history.

(56) References Cited

U.S. PATENT DOCUMENTS 6,677,994 B1 * 1/2004 Kobayashi .................... 348/252
8,067,740 B2 * 11/2011 Sasaki et al. ............... 250/338.4
(Continued)

FOREIGN PATENT DOCUMENTS

| CN | 101271163 | 9/2008 |
|---|---|---|
| EP | 2261617 | 12/2010 |

(Continued)

*Primary Examiner* — Christine Sung
(74) *Attorney, Agent, or Firm* — Drinker Biddle & Reath LLP

(57) ABSTRACT

Provided is an infrared image sensor for detecting infrared rays. The infrared image sensor includes a light-receiving unit including a pixel region in which a plurality of pixels are arranged and at least one reference pixel; a difference circuit for acquiring a first differential signal that is a differential signal between a signal of one pixel contained in the pixel region and a signal of the reference pixel and a second differential signal that is a differential signal between signals of two predetermined pixels out of the pixels contained in the pixel region; and a pixel signal calculating unit that calculates a signal of each of the pixels on the basis of the first differential signal and the second differential signal.

9 Claims, 15 Drawing Sheets

(51) Int. Cl.
*G01J 5/20* (2006.01)
*H04N 5/357* (2011.01)

(56) References Cited

U.S. PATENT DOCUMENTS

2008/0087823 A1    4/2008  Murata et al.
2011/0210251 A1*   9/2011  Onakado et al. ............. 250/332

FOREIGN PATENT DOCUMENTS

| | | |
|---|---|---|
| JP | H07-212656 A | 8/1995 |
| JP | H10-227689 A | 8/1998 |
| JP | 2001-215152 A | 8/2001 |
| JP | 2001-296184 A | 10/2001 |
| JP | 2004-233314 A | 8/2004 |
| JP | 2007-114089 A | 5/2007 |
| JP | 2009-222585 A | 10/2009 |

* cited by examiner

INFRARED IMAGE SENSOR AND SIGNAL READ METHOD

TECHNICAL FIELD

Various aspects and embodiments of the present invention relate to an infrared image sensor and a signal read method.

BACKGROUND ART

Conventionally, as an infrared image sensor, thermal detectors for detecting infrared rays using a material whose resistance value varies with temperature are known (see Patent Literatures 1 and 2 for example). The detector described in Patent Literature 1 is what is called a bolometer-type infrared detector, configured such that a plurality of pixels each including a heat sensitive resistor for sensing incident infrared rays are arranged two-dimensionally. This infrared detector is provided with a reference pixel for each of the pixels, and calculates the difference between a signal of each pixel and a signal of each reference pixel to compensate for the influence of environment changes around the infrared detector.

An infrared detector described in Patent Literature 2 is configured such that a plurality of pixels each including a heat sensitive resistance for sensing incident infrared rays are arranged two-dimensionally. This infrared detector is provided with a reference pixel for each column of pixels, and calculates the difference between a signal of each pixel and a signal of each reference pixel to compensate for the temperature rise of diodes due to self-heating when a current is caused to flow to the pixels. In other words, compensation for the self-heating in a plurality of pixels contained in a line of pixels is performed with one reference pixel.

CITATION LIST

Patent Literature

[Patent Literature 1] Japanese Patent Application Laid-Open Publication No. H10-227689
[Patent Literature 2] Japanese Patent Application Laid-Open Publication No. 2001-215152

SUMMARY OF INVENTION

Technical Problem

In the infrared image sensor described in Patent Literature 1, because each reference pixel needs to be provided adjacent to each of all pixels, the aperture ratio thereof is smaller than that of an infrared image sensor having the same pixel area and the sensitivity thereof decreases accordingly. In the infrared image sensor described in Patent Literature 2, each column of pixels is provided with one reference pixel, whereby the sensitivity can be maintained, but there is a possibility that self-heating cannot be appropriately compensated. For example, when one pixel column is read, each of the pixels thereon for detection is energized only once to read information, but the reference pixel thereof is energized a plurality of times equal to the number of the pixels to read information. Accordingly, the amount of self-heating of the reference pixel is larger than the amount of self-heating of each of the pixels for detection, and there are occasions when the self-heating cannot be appropriately compensated.

In this technical field, an infrared image sensor and a signal read method are desired that make it possible to maintain the sensitivity while sufficiently compensating for the amount of self-heating.

Solution to Problem

An infrared image sensor according to one aspect of the present invention is an infrared image sensor for detecting infrared rays, the infrared image sensor configured to include a light-receiving unit including a pixel region in which a plurality of pixels are arranged and at least one reference pixel; a difference circuit for acquiring a first differential signal that is a differential signal between a signal of one pixel contained in the pixel region and a signal of the reference pixel and a second differential signal that is a differential signal between signals of two predetermined pixels out of the pixels contained in the pixel region; and a pixel signal calculating unit that calculates a signal of each of the pixels on the basis of the first differential signal and the second differential signal.

In the infrared image sensor according to one aspect of the present invention, at least one reference pixel is arranged in the pixel region. This arrangement can maintain the sensitivity of the sensor. Furthermore, the difference circuit acquires a first differential signal that is a differential signal between a signal of one pixel contained in the pixel region and a signal of the reference pixel and a second differential signal that is a differential signal between signals of two predetermined pixels out of the pixels contained in the pixel region, and the pixel signal calculating unit calculates a signal of each of the pixels on the basis of the first differential signal and the second differential signal. Using differential signals between pixels in this manner eliminates the necessity of comparing all of the pixels contained in the pixel region with one reference pixel, thereby making it possible to reduce the difference between the amount of self-heating of the reference pixel and the amount of self-heating of each of the pixels for detection. Accordingly, it is possible to maintain the sensitivity while sufficiently compensating for the amount of self-heating.

In one embodiment, the two predetermined pixels may be connected in series with respective first ends thereof connected to each other and also with the respective second ends connected to different potentials, and the difference circuit may acquire the second differential signal on the basis of a difference between a potential at the connecting point of the two predetermined pixels and a predetermined potential. Alternatively, in one embodiment, the two, predetermined pixels each may be connected to different resistances in series with respective first ends thereof connected to the resistances and also with respective second ends connected to a same potential, and the difference circuit may acquire the second differential signal on the basis of a difference between potentials at respective connecting points of the two predetermined pixels to the resistances. Configuring the infrared image sensor in this manner makes it possible to easily calculate the second differential signal that is a differential signal between the two predetermined pixels.

In one embodiment, the pixel region may include at least one pixel line, and the reference pixel may be arranged at one end of the at least one pixel line. Configuring the infrared image sensor in this manner makes it possible to arrange the reference pixel so as not to influence the sensitivity of the infrared image sensor.

In one embodiment, the pixel region may include at least one pixel line, and the reference pixel may be arranged at each of both ends of the at least one pixel line. Configuring the infrared image sensor in this manner makes it possible to further reduce the influence of the self-heating by, for example, obtaining signals for each of the pixels with the respective two reference pixels used as references and averaging the signals.

In one embodiment, the two predetermined pixels may be adjacent pixels. Configuring the infrared image sensor in this manner makes it possible to reduce the influence of temperature changes in the use environment and the influence of variations in characteristics at different positions in an element formation surface.

In addition, a signal read method according to another aspect of the present invention is a signal read method performed by an infrared image sensor including a light-receiving unit that has a pixel region including at least one pixel line and two reference pixels arranged at one end of the pixel line, the signal read method configured to include a differential signal acquisition step of acquiring a first differential signal that is a differential signal between a signal of one pixel contained in the pixel region and a signal of each of the reference pixels and a second differential signal that is a differential signal between two predetermined signals out of a plurality of pixels contained in the pixel region; and a pixel signal calculation step of calculating a signal of each of the pixels on the basis of the first differential signal and the second differential signal, wherein at the differential signal acquisition step, the first differential signal and the second differential signal are acquired from a first reference pixel of the reference pixels as a starting point and then from adjacent pixels in series and also the first differential signal and the second differential signal are acquired from a second reference pixel of the reference pixels as a starting point and then from adjacent pixels in series and, at the pixel signal calculation step, a signal of each of the pixels is calculated based on the first differential signal and the second differential signal that are obtained with the first reference pixel as a starting point and also a signal of each of the pixels is calculated based on the first differential signal and the second differential signal that are obtained with the second reference pixel as a starting point, and based on two results thus calculated, a signal of each of the pixels is calculated.

By the signal read method according another aspect of the present invention, the second differential signal is calculated in two ways with two reference pixels, signals for each of the pixels are obtained with the respective two reference pixels used as references, and the signals are averaged, whereby the influence of self-heating can be further reduced.

Advantageous Effects of Invention

As described above, various aspects and embodiments of the present invention make it possible to maintain the sensitivity while sufficiently compensating for the amount of self-heating.

DESCRIPTION OF EMBODIMENTS

Embodiments will be described hereinafter with reference to the attached drawings. In explanations of the drawings, the same reference signs are given to the same elements, and duplicate explanations are omitted.

First Embodiment

Figure 1:
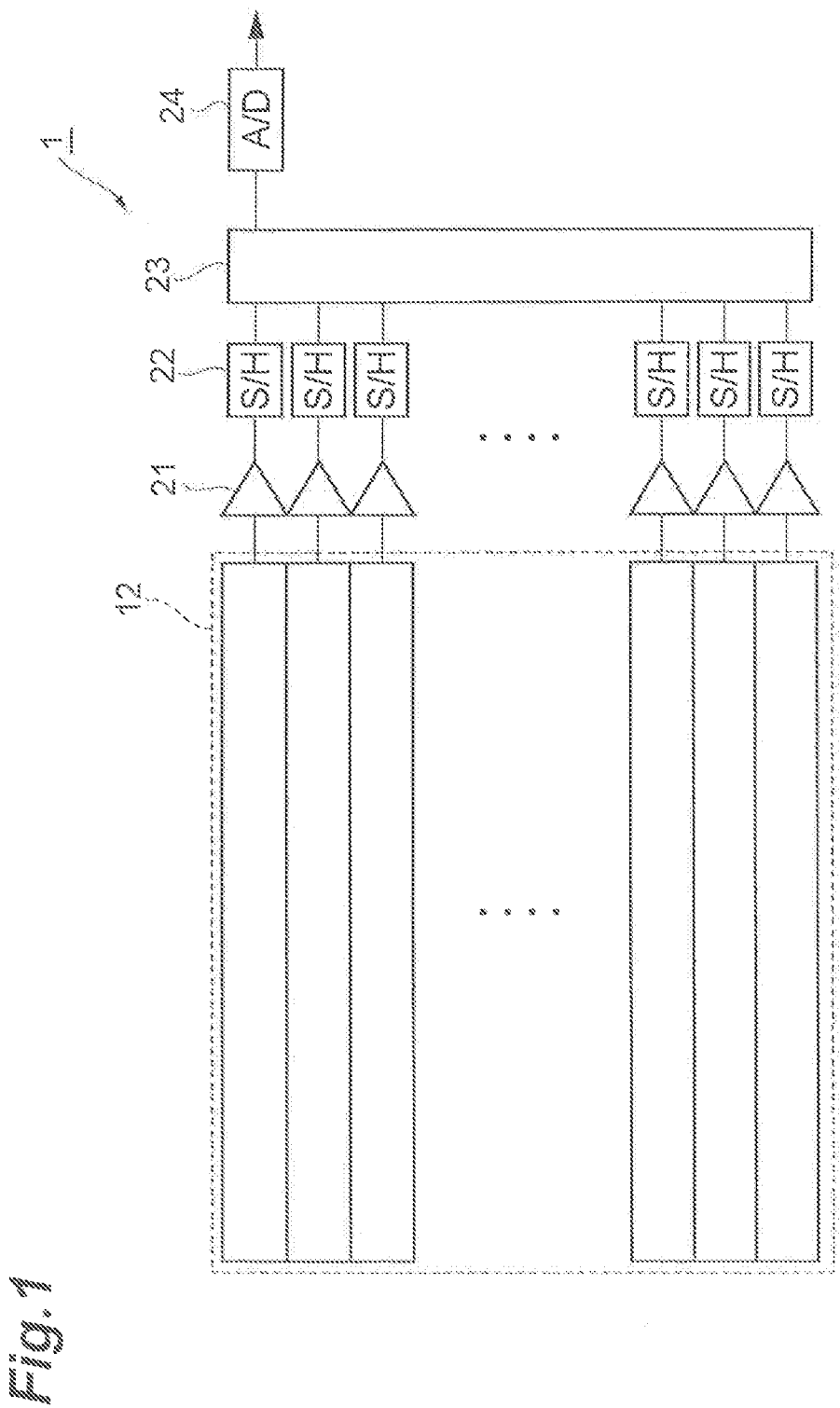
FIG. 1 is a schematic block diagram of an infrared image sensor according to an embodiment.
Figure 2:
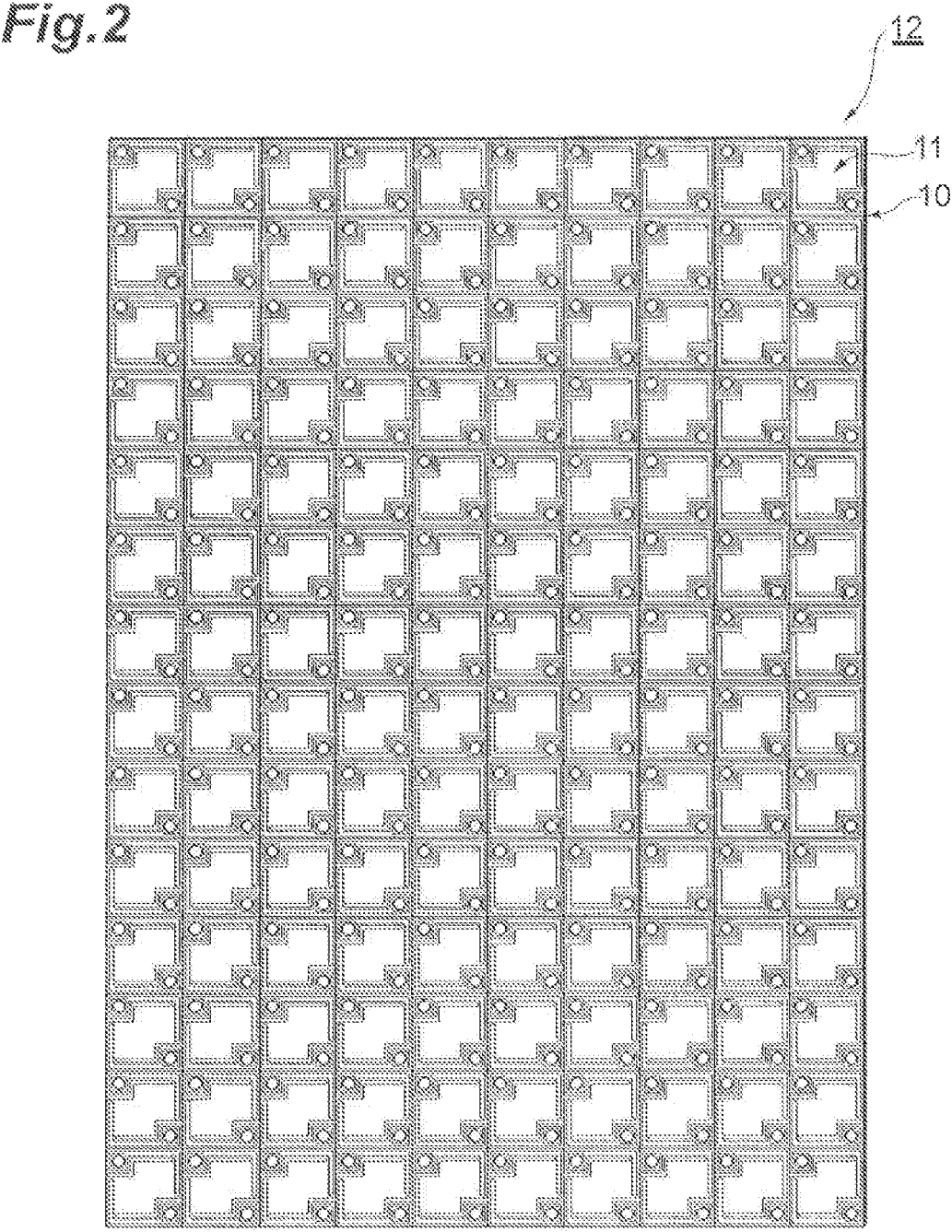
FIG. 2 is a partially enlarged plan view of a light-receiving unit of FIG. 1.
Figure 3:
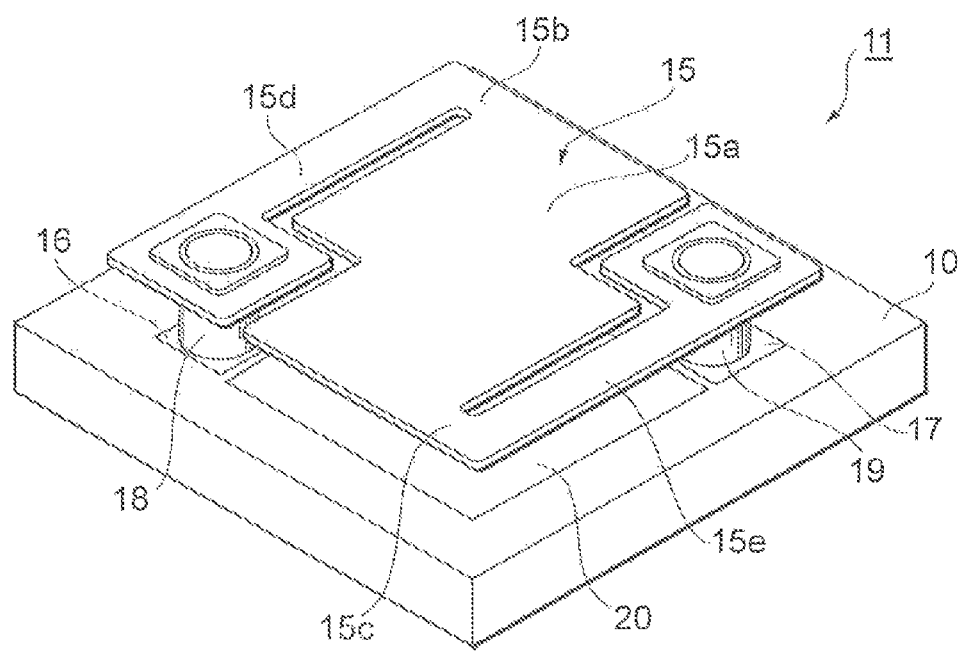
FIG. 3 is a perspective view of bolometer elements in the light-receiving unit of FIG. 1.

An infrared image sensor according to a first embodiment is what is called a bolometer-type infrared image sensor for detecting infrared rays using a material whose resistance varies with temperature, and is preferably used for infrared imagers and thermography, for example. To begin with, configuration of the infrared image sensor according to the present embodiment will be described. FIG. 1 is a schematic block diagram of the infrared image sensor according to the present embodiment. FIG. 2 is a plan view in which part of a light-receiving unit of FIG. 1 is enlarged. FIG. 3 is a perspective view illustrating a configuration of one pixel of the light-receiving unit of FIG. 1.

As depicted in FIG. 1, this infrared image sensor 1 is a detector that detects infrared rays on the basis of heat changes, and includes a light-receiving unit 12 that functions as an infrared light receiver. The light receiver 12 is configured as a two-dimensional infrared sensor array having a pixel region in which a plurality of pixels of m columns×n rows are arranged. Each of integrating amplifiers 21 is connected to each row of the light-receiving unit 12. Each of sample/hold circuits 22 for retaining analog signals output from the integrating amplifiers 21 is connected to each of the integrating amplifiers 21. A switch circuit 23 and an A/D converter 24 are connected to the sample/hold circuits 22 in this order. The switch circuit 23 sequentially selects outputs from the sample/hold circuits 22 and outputs signals to the A/D converter 24. The A/D converter 24 digitizes image signals of each row selected by the switch circuit 23 and stores digital outputs in a memory not depicted. The digital outputs stored in the memory are signal processed by a signal processor not depicted, whereby a visual image is constructed and sent to an image display circuit or an image operation circuit. Although FIG. 1 depicts an example in which signals of all rows are switched by the switch circuit 23 and are digitized by the A/D converter 24 being one unit, all of the rows may be divided into several blocks and the switch circuit 23 and the A/D converter 24 may be provided to each of the blocks. In this case, the A/D converter 24 does not have to be of a high-speed type. Alternatively, the A/D converter 24 may be provided to each row with the switch circuit 23 omitted.

As depicted in FIG. 2, the light-receiving unit 12 is formed by two-dimensionally arraying a plurality of pixels (bolometer elements 11) on a substrate 10, and is designed as what is called a surface micromachine. As depicted in FIG. 3, each bolometer element 11 constituting a pixel is configured to include read only IC (ROIC) pads 16 and 17, electrode plugs 18 and 19 respectively formed on the ROIC pads 16 and 17, and a bolometer thin film 15 arranged apart from a surface of the substrate 10.

The ROIC pads 16 and 17 are rectangular pads having electrical conductivity and are electrically connected with a signal processing circuit portion (not depicted). The electrode plugs 18 and 19 are formed on the ROIC pads 16 and 17 approximately in a column shape extending in a laminated direction, and are electrically connected with the ROIC pads 16 and 17. The electrode plugs 18 and 19 are made of material having electrical conductivity and, for example, Al is used.

The bolometer thin film 15 is a thin film arranged approximately parallel to the substrate 10, and has a light-receiving portion 15a that is rectangular and plane and receives infrared rays, and beam portions 15d and 15e formed at corners 15b and 15c of the light-receiving portion 15a. The beam portions 15d and 15e extend from the corners 15b and 15c along an outer periphery of the light-receiving portion 15a, and are formed to face each other. The light-receiving portion 15a and the beam portions 15d and 15e are spatially separated from each other with slits therebetween, and thus thermally isolated. For the bolometer thin film 15, a material having resistivity that changes significantly with temperature changes is used and, for example, amorphous silicon is used.

Furthermore, at the beam portions 15d and 15e of the bolometer thin film 15, wires electrically connected with the light-receiving portion 15a are provided along contours of the beam portions 15d and 15e. As depicted in FIG. 3, the bolometer thin film 15 is supported on the surface of the substrate 10 with first ends of the beam portions 15d and 15e respectively connected to the electrode plugs 18 and 19, and a void is formed between the bolometer thin film 15 and the substrate 10. The wires of the beam portions 15d and 15e are electrically connected to the electrode plugs 18 and 19, respectively. This connection electrically connects the wires with the circuit portion via the electrode plugs 18 and 19 and the ROIC pads 16 and 17. Furthermore, in a region facing the bolometer thin film 15, a reflection film 20 is laminated on the surface of the substrate 10 of the bolometer element 11. For this reflection film 20, a metal having a high reflectance to infrared rays is used.

In this manner, the bolometer element 11 is configured such that the bolometer thin film 15 is apart from the surface of the substrate 10 and arranges approximately parallel to the substrate 10 (membrane structure), and the bolometer thin film 15 and the substrate 10 are configured to be spatially separated with the void and thermally isolated. The bolometer element 11 is configured such that the resistivity change due to temperature changes of the light-receiving portion 15a of the bolometer thin film 15 can be read at the circuit portion via the wires, the electrode plugs 18 and 19, and the ROIC pads 16 and 17.

Figure 4:
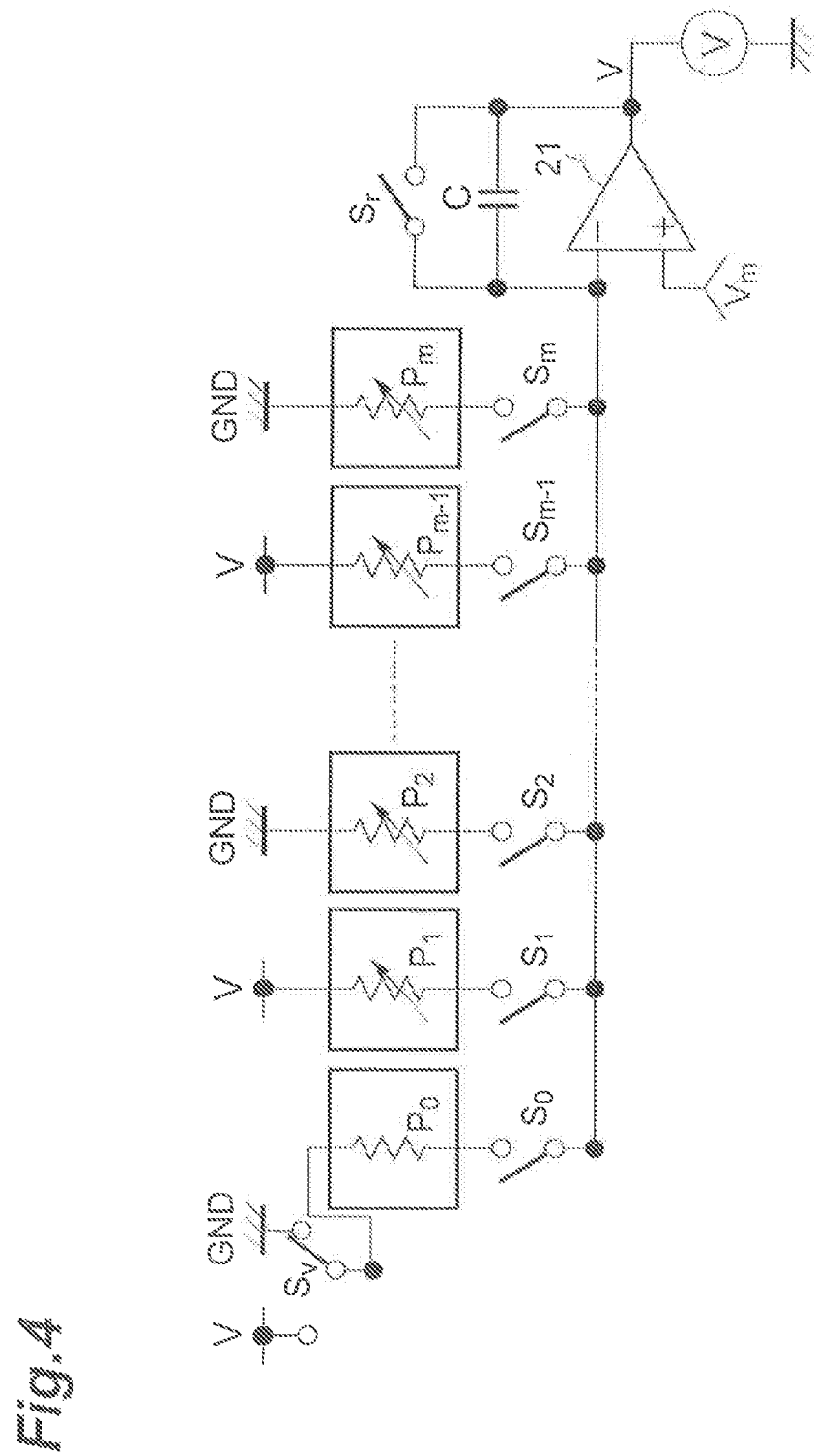
FIG. 4 is a circuit diagram of a difference detection circuit in each row of the light-receiving unit of FIG. 1.

FIG. 4 is a circuit diagram illustrating in detail a circuit (difference circuit) up to the integrating amplifier 21 in each row of the light-receiving unit 12. As depicted in FIG. 4, one line portion of the light-receiving unit 12 is configured to include m (m: an integer) pixel sensors $P_m$, one reference sensor $P_0$, and switches $S_m$ for connecting two predetermined pixel sensors $P_x$ and $P_y$ (x, y: integers) with the integrating amplifier 21. In other words, the one reference sensor $P_0$ is provided to each pixel line. The reference sensor $P_0$ is arranged at one end of each pixel line, for example. The reference sensor $P_0$ is a sensor that is formed in the same environment as that of each of the pixel sensors $P_m$, has a structure similar to that of each of the pixel sensors $P_m$, and differs from the pixel sensor $P_m$ in having no sensibility to infrared rays. The reference sensor $P_0$ is configured to have a function of blocking infrared rays, for example, or exclude an infrared ray absorbing film that is generally provided to the pixel sensors $P_m$. Note that a switch $S_0$ is connected to one end of the reference sensor $P_0$ only, and a switch $S_v$ is connected to the other end. The reference sensor $P_0$ is configured to be connectable to a power source potential V and also to a ground potential (GND: a potential of 0 volt). Note that as the two predetermined pixel sensors $P_x$ and $P_y$ connected by the switches $S_m$, those in which the distance between the pixel sensors $P_x$ and $P_y$ is equal to or shorter than 500 micrometers, for example, are selected. As the two predetermined pixel sensors $P_x$ and $P_y$, those that are adjacent may be used. The first embodiment will be described on the assumption that the two predetermined pixel sensors $P_x$ and $P_y$ are adjacent for convenience of explanation and understanding.

First ends of neighboring pixel sensors $P_{n-1}$ and $P_n$ (n: an integer) are connected to the power source potential V or the ground potential (0 V) alternately. When the two neighboring pixel sensors $P_{n-1}$ and $P_n$ are connected by switches $S_{n-1}$ and $S_n$, the two pixel sensors $P_{n-1}$ and $P_n$ are connected in series between the power source potential V and the ground potential (0 V). The connecting points of the two pixel sensors $P_{n-1}$ and $P_n$ are connected to a minus input terminal of the integrating amplifier 21. The integrating amplifier 21 is a current-detecting-type integrating amplifier. A reference voltage $V_m$ (where $V_m=V/2$) is input to a plus input terminal of the integrating amplifier 21. For example, when switches $S_1$ and $S_2$ are turned on, connections of a pixel sensor $P_1$ and a pixel sensor $P_2$ to the integrating amplifier 21 are established, and the difference between currents flowing through the pixel sensor $P_1$ and the pixel sensor $P_2$ is accumulated in an integrating capacitor C of the integrating amplifier 21. As described above, in the present embodiment, neighboring pixel sensors $P_m$ are configured to be always connected by the switches $S_m$ so that difference signals thereof are integrated by the integrating amplifier 21 to be output as a voltage signal.

Figure 5:
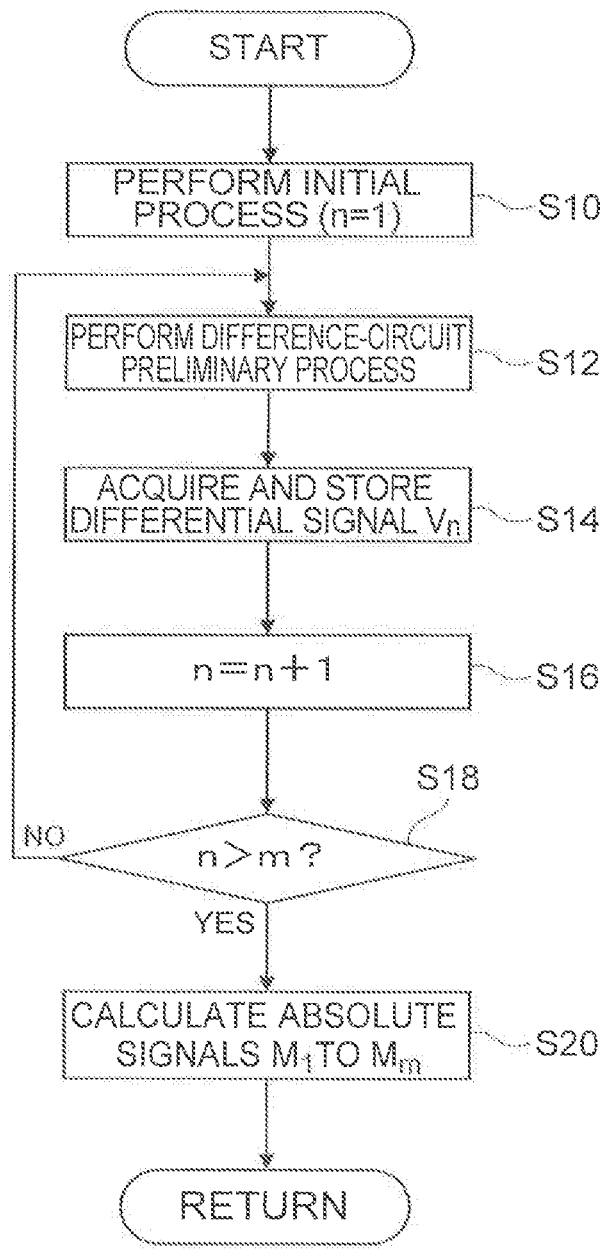
FIG. 5 is a flowchart for explaining a first signal read operation of the infrared image sensor depicted in FIG. 4.

The following describes operation of the infrared image sensor according to the present embodiment. There are two ways of signal acquisition operation of the infrared image sensor according to the present embodiment. FIG. 5 is a flowchart illustrating a first signal acquisition operation of the infrared image sensor according to the present embodiment. Control processes depicted in FIG. 5 are repeatedly performed at predetermined intervals from the timing when the power source of the infrared image sensor is turned on, for example. Note that the control processes depicted in FIG. 5 are performed by a control unit (not depicted) included in the infrared image sensor. For example, the control unit includes an arithmetic processor such as a CPU.

To begin with, the control unit performs an initial process (S10). In the process at S10, the control unit sets a count value n (n: an integer) defining the processing order to one. Subsequently, the control unit performs a difference-circuit preliminary process (S12). In the process at S12, as an initial process for obtaining a differential signal $V_n$ of neighboring pixel sensors $P_{n-1}$ and $P_n$, the control unit turns on a switch $S_r$ that is installed in a negative feedback portion of the integrating amplifier 21 as depicted in FIG. 4, discharges electric charge accumulated in the integrating capacitor C, and then turns off the switch $S_r$. When the process at S12 is completed, the flow proceeds to a differential signal acquisition/storage process (S14).

In the process at S14, the control unit acquires a differential signal $V_n$ of neighboring pixel sensors $P_{n-1}$ and $P_n$. The control unit turns on the switch $S_{n-1}$ and the switch $S_n$, connects the pixel sensor $P_{n-1}$ and the pixel sensor $P_n$ in series, and integrates differential signals with the integrating amplifier 21. After an integration time of s seconds, the control unit inputs the output voltage of an output of the integrating amplifier 21 as $V_n$ into the sample/hold circuit 22. Note that the control unit switches the switch $S_v$ to the GND side and acquires a differential signal $V_1$ between the reference sensor $P_0$ and the pixel sensor $P_1$ only when n=1. When the process at S14 is completed, the flow proceeds to a count process (S16).

In the process at S16, the control unit increments the count value n. When the process at S16 is completed, the flow proceeds to a count-value determination process (S18).

In the process at S18, the control unit determines whether the count value n counted in the process at S18 is larger than the number of pixels m. In the process at S18, when the control unit determines that the count value n is not larger than the number of pixels m, the flow proceeds again to the difference-circuit preliminary process (S12). In this manner, until differential signals $V_n$ are acquired from all neighboring pixel sensors $P_{n-1}$ and $P_n$, the processes at S12 to S18 are repeatedly performed. Note that the control unit performs this repetitive operation so that the operation can be completed within one frame period and inputs the differential signals $V_1$ to $V_m$ to the sample/hold circuit 22. The differential signals $V_n$ between the respective pixel sensors $P_n$ stored in the sample/hold circuit 22 are sent to the A/D converter 24 by the switch circuit 23, converted into digital signals, and then stored in the memory.

By contrast, in the process at S18, when the control unit determines that the count value n is larger than the number of pixels m, this means that differential signals $V_n$ are acquired from all pixel sensors, and accordingly the flow proceeds to an absolute signal calculation process (S20).

In the process at S20, the control unit calculates absolute signals, using the differential signals $V_n$ acquired in the process at S14. Note that this operation is performed by a pixel signal calculating unit included in the control unit. Among all difference signals $V_1, V_2, V_3, \ldots$, and $V_m$, only the differential signal $V_1$ is a differential signal with respect to the reference sensor $P_0$. Accordingly, only from the differential signal $V_1$ (first differential signal), a signal that is proportional to the amount of infrared light received by the pixel sensor $P_1$ can be obtained. However, each of the differential signal $V_2$ and the following ones is a differential signal (second differential signal) of the amount of infrared light with respect to the neighboring pixel sensor. Thus, an arithmetic operation needs to be performed to acquire the whole image. Assuming that respective signals proportional to the amounts of infrared light at the respective pixel sensors are $M_1, M_2, M_3, \ldots$, and $M_m$, $V_m$ can be expressed as follows.

$$V_1 = M_1$$
$$V_2 = M - 1 - M_2$$
$$V_3 = M_3 - M_2$$
$$\vdots$$
$$\vdots$$
$$V_m = M_{m-1} - M_m$$

According to the above formulas, to obtain the absolute signal $M_2$ of the pixel sensor $P_2$, $V_1$-$V_2$ could be calculated. After the absolute signal $M_2$ is calculated, the absolute signal $M_3$ can be calculated by summing the absolute signal $M_2$ and the differential signal $V_3$. Subsequently, by sequentially performing addition and subtraction, absolute values for all pixel sensors $P_n$ can be obtained as follows.

$$M_1 = V_1$$
$$M_2 = M_1 - V_2 = V_1 - V_2$$
$$M_3 = V_3 + M_2 = V_1 - V_2 + V_3$$
$$M_4 = M_3 - V_4 = V_1 - V_2 + V_3 - V_4$$
$$\vdots$$
$$\vdots$$
$$M_m = M_{m-1} - V_m = V_1 - V_2 + V_3 - V_4 + \ldots - V_m$$

Note that these calculations are simple additions and subtractions and thus it is sufficiently possible to calculate them in real time with software or hardware. Completion of the process at S20 completes the control processes depicted in FIG. 5.

As described above, the control processes depicted in FIG. 5 are completed. By performing the control processes depicted in FIG. 5, connection between the amplifier and a portion by which neighboring pixel sensors are connected is established, whereby a differential signal thereof is acquired. Because the whole length of the pixel line is several millimeters, variations on the order of several percent occur in resistance value for pixel sensors of the whole line. However, because adjacent pixel sensors are apart from each other by a distance of the order of several tens micrometers, for example, environments for semiconductor processes during element formation are approximately the same and there is almost no difference in characteristics between two pixel sensors connected. Accordingly, under conditions of no input, the divided voltage thereof is V/2, and thus no offset is generated in the output. In other words, differential signals between pixels can be acquired under conditions almost free from the influence of variations in semiconductor processes, whereby offset generated by surrounding temperature changes can be almost eliminated.

In addition, by performing the control processes depicted in FIG. 5, the reference sensor $P_0$ is energized only once during one frame. Accordingly, the situation can be avoided in which self-heating becomes excessive only in the reference sensor $P_0$ by being connected with all pixel sensors and energized a plurality of times.

Figure 6:
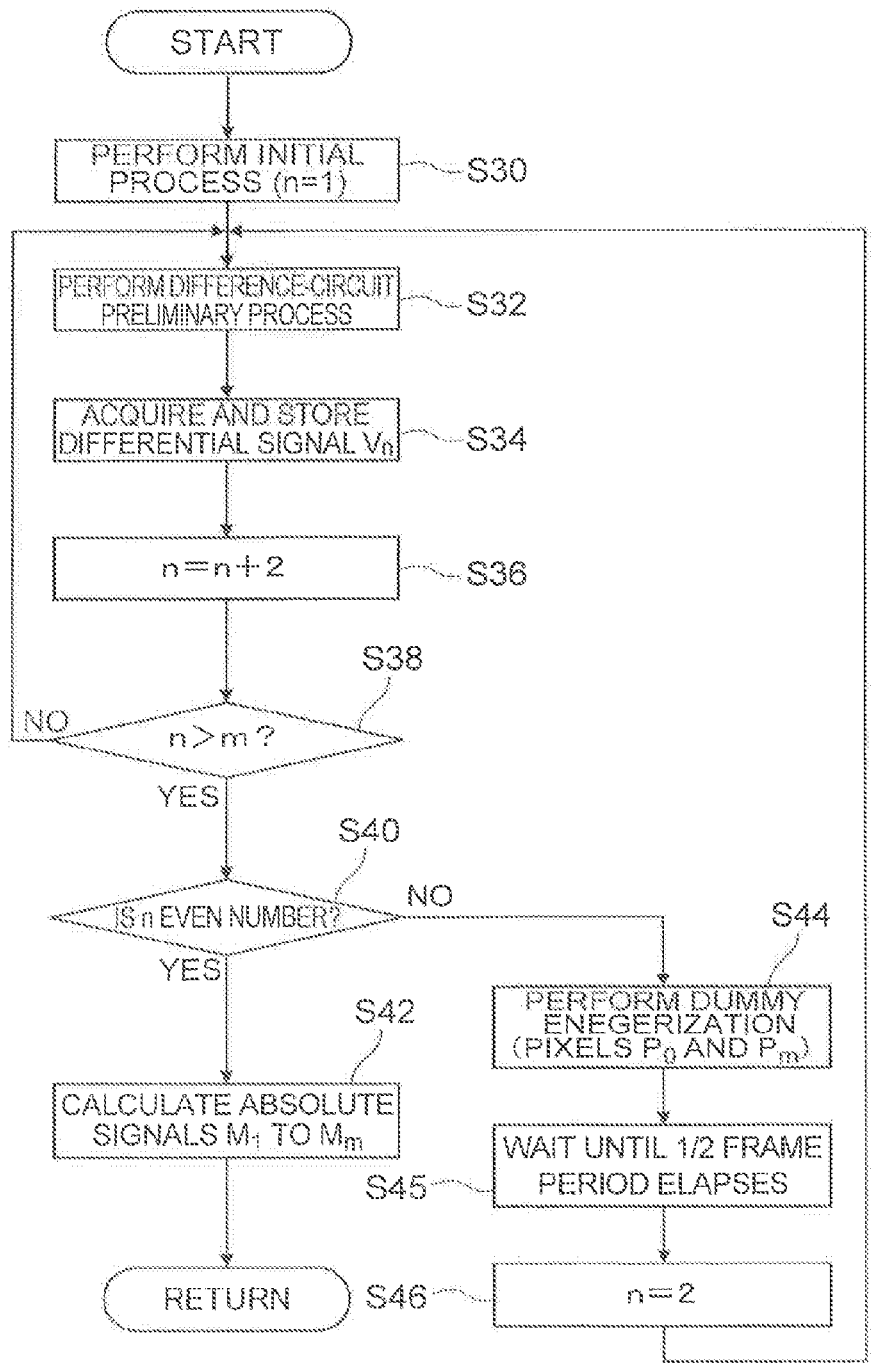
FIG. 6 is a flowchart for explaining a second signal read operation of the infrared image sensor depicted in FIG. 4.

The following describes a second signal acquisition operation of the infrared image sensor according to the present embodiment. FIG. 6 is a flowchart illustrating the second signal acquisition operation of the infrared image sensor according to the present embodiment. Control processes depicted in FIG. 6 are repeatedly performed at predetermined intervals from the timing when the power source of the infrared image sensor is turned on, for example. Note that the control processes depicted in FIG. 6 are performed by a control unit (not depicted) included in the infrared image sensor. For example, the control unit includes an arithmetic processor such as a CPU.

To begin with, the control unit performs an initial process (S30). The process at S30 is the same as the process at S10 in FIG. 5, and the control unit sets the count value n to 1. Subsequently, the control unit performs a difference-circuit preliminary process (S32). The process at S32 is the same as the process at S12, and the control unit discharges the electric charge accumulated in the integrating capacitor C. When the process at S32 is completed, the flow proceeds to a differential signal acquisition/storage process (S34). The process at S34 is the same as the process at S14, and the control unit acquires and stores therein a differential signal $V_n$. When the process at S34 is completed, the flow proceeds to a count process (S36).

In the process at S36, the control unit increments the count value n. Herein, the control unit adds two to the count value n. When the process at S36 is completed, the flow proceeds to a count-value determination process (S38).

The process at S38 is the same as the process at S18, and the control unit determines whether the count value n counted in the process at S36 is larger than the number of pixels m. In the process at S38, when the control unit determines that the count value n is not larger than the number of pixels m, the flow proceeds again to the difference-circuit preliminary process (S32). Then in the process at S34, the control unit acquires the (n+2)th differential signal V in an integration time s. In this manner, the control unit adds two to the count value each in the process at S36, and sequentially acquires differential signals such as $V_1$, $V_3$, $V_5$, and $V_{m-1}$, suffixes of differential signals V of which are odd numbers only until the count value n becomes larger than the number of pixels m. Note that the control unit performs this repetitive operation so that the operation can be completed within ½ frame period and inputs the differential signals thus acquired to the sample/hold circuit 22. To perform the repetitive operation within ½ frame period, the control unit sets the integration time s for the differential signals equal to or shorter than a time T that is obtained by dividing one frame period by m+2 being the sum of the number of pixels m and two.

By contrast, in the process at S38, when the control unit determines that the count value n is larger than the number of pixels m, the flow proceeds to an even-number determination process (S40). In the process at S40, when the control unit determines that the count value n is not an even number, the flow proceeds to a dummy energization process (S44).

In the process at S44, the control unit connects the reference sensor $P_0$ and the pixel sensor $P_m$ depicted in FIG. 4. At this time, the control unit connects the switch $S_v$ to the power source V. The process at S44 is a process performed to equalize the number of times sensors arranged at both ends of a pixel line are energized, and operation therein is merely for the purpose of energization. The following describes the details. In the first signal acquisition operation described above, as understood from the above-described formulas for calculating differential signals $V_n$, each of the pixel sensors $P_m$ is energized twice in one line. For example, the pixel sensor $P_1$ is energized when the differential signal $V_1$ is acquired and when the differential signal $V_2$ is acquired. Consequently, in the first signal acquisition operation, only the number of times the reference sensor $P_0$ and the pixel sensor $P_m$ are energized differs from the number of times for the other pixel sensors. In other words, the reference sensor $P_0$ is energized only once when the differential signal $V_1$ is acquired, and the pixel sensor $P_m$ is energized only once when the differential signal $V_m$ is acquired. Accordingly, in the second signal acquisition operation, other than energization for signal acquisition, an operation only for the purpose of energization with the reference sensor $P_0$ and the pixel sensor $P_m$ connected is also added so that the reference sensor $P_0$ and the pixel sensor $P_m$ are energized twice similarly to the other sensors. The process at S44 equalizes self-heating among all pixels. When the process at S44 is completed, the flow proceeds to a time adjustment process (S45).

The process at S45 is a process in which the control unit waits until ½ frame period elapses. This process is introduced because the acquisition of each differential signal can be completed in a short period of time and it is necessary to obtain latter half (even-numbered) differential signals after dissipation of self-heating. This process can delay the start of the latter half signal acquisition processes to the time when ½ frame has elapsed, thereby sufficiently dissipating heat from elements that have generated the heat in the first half (odd-numbered) signal acquisition. Note that this wait time may be zero. The total periods of time for first half and latter half signal acquisitions each may be set to ½ frame period. Alternatively, a dummy sensor $P_d$ may be arranged to perform dummy energization to $P_0$ and to $P_m$ independently. When the process at S45 is completed, the flow proceeds to a count reset process (S46).

In the process at S46, the control unit sets the count value n to two. In other words, the control unit sets the count value n to start from an even number. Note that because the integration time s is set as above, acquisition of odd-numbered differential signals and dummy energization can be completed within the first-half frame period out of one frame period, and signal acquisition of the differential signal $V_2$ can be started at the time ½ frame period later than the time of signal acquisition of the differential signal $V_1$. When the process at S46 is completed, the flow proceeds again to the difference-circuit preliminary process (S32). Then, the control unit acquires the differential signal $V_2$ in the process at S34, adds two to the count value n in the process at S36 and, in the process at S38, determines whether the count value n counted in the process at S36 is larger than the number of pixel m. In the process at S38, when the control unit determines that the count value n is not larger than the number of pixels m, the flow proceeds again to the difference-circuit preliminary process (S32). Then in the process at S34, the control unit acquires the (n+2)th differential signal V. In this manner, the control unit adds two to the count value each in the process at S36, and sequentially acquires differential signals such as $V_2$, $V_4$, $V_6$, and $V_m$, suffixes of differential signals V of which are even numbers only until the count value n becomes larger than the number of pixels m. By contrast, when the control unit determines that the count value n is larger than the number of pixels m in the process at S38, the flow proceeds to the even-number determination process (S40). In the process at S40, when the control unit determines that the count value n is an even number, the flow proceeds to an absolute signal calculation process (S42).

In the process at S42, the pixel signal calculating unit calculates absolute signals $M_m$, using differential signals $V_n$ acquired in the process at S34. This process is the same as the process at S20. Completion of the process at S42 completes the control processes depicted in FIG. 6.

As described above, the control processes depicted in FIG. 6 are completed. By performing the control processes depicted in FIG. 6, differential signals between pixels can be acquired under conditions almost free from the influence of variations in semiconductor processes similarly to the case of performing the control processes depicted in FIG. 5, whereby offset generated by surrounding temperature changes can be almost eliminated.

In addition, by performing the control processes depicted in FIG. 6, the reference sensor $P_0$ is energized twice during one frame. Accordingly, the situation can be avoided in which self-heating becomes excessive only in the reference sensor $P_0$ by being connected with all pixel sensors and energized a plurality of times, and also the number of times the reference sensor $P_0$ is energized and the number of times the pixel sensors are energized can be equalized.

Furthermore, by performing the control processes depicted in FIG. 6, after odd-numbered differential signals V are acquired, even-numbered differential signals V are acquired. By this energization, a pixel sensor that has been energized once can be avoided from being energized continuously. In other words, a period of time for dissipating heat of self-heating can be secured, and thus differential signals can be acquired by using pixel sensors from which heat has been dissipated.

Figure 7:
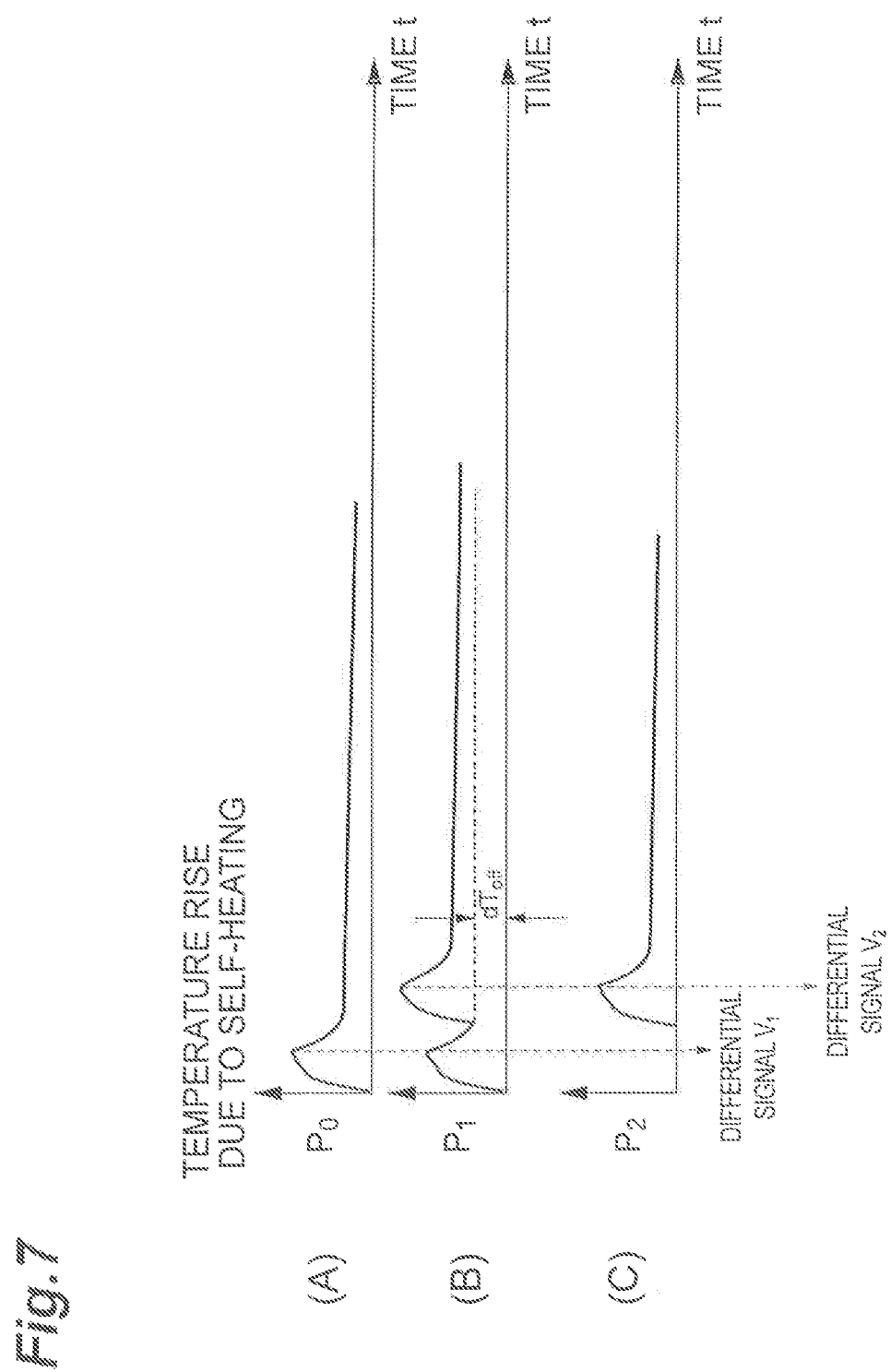
FIG. 7 is a schematic diagram for explaining the time dependence of temperature rise due to self-heating when the operation depicted in FIG. 5 is performed.
Figure 8:
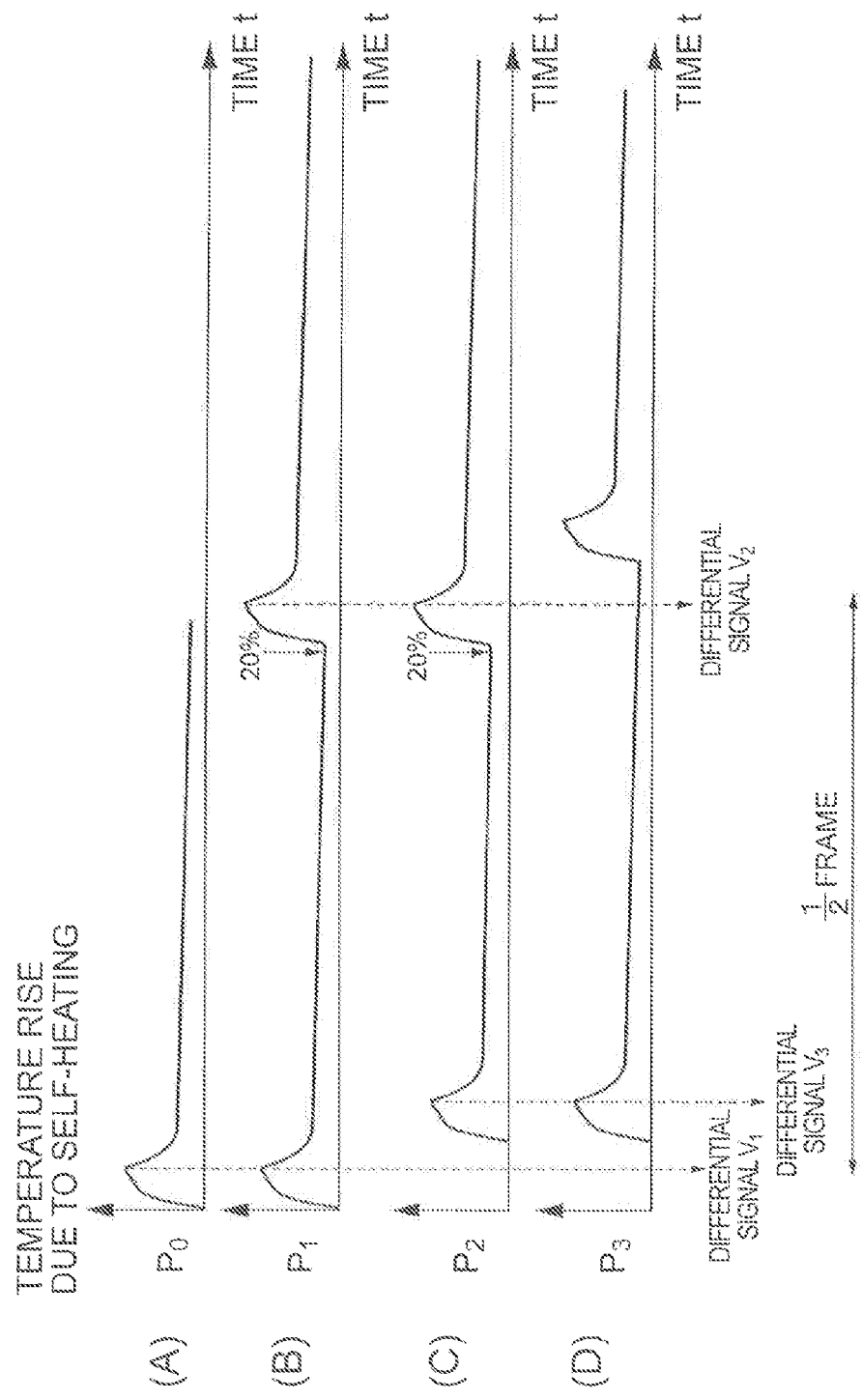
FIG. 8 is a schematic diagram for explaining the time dependence of temperature rise due to self-heating when the operation depicted in FIG. 6 is performed.

The following describes the period of time for dissipating heat of self-heating in detail with reference to FIGS. 7 and 8. FIG. 7 illustrates the time dependence of temperature rise in each of the pixel sensors when signals are sequentially acquired as depicted in FIG. 5, and FIG. 8 illustrates the time dependence of temperature rise in each of the pixel sensors when signals are acquired in the order of even-numbered signals and then odd-numbered signals as depicted in FIG. 6. As depicted in FIG. 7, when differential signals are acquired in the order of $V_1, V_2, V_3, \ldots$, because one of neighboring pixel sensors is energized at the time of acquiring the previous signal, a differential signal between a pixel sensor that has already been energized and a sensor that has not yet been energized (actually, this sensor had been energized one frame earlier, but a long period of time has elapsed compared to the time constant, and heat dissipation has almost been completed) is acquired, and thus temperature rise due to self-heating cannot be completely canceled.

The temperature rise due to self-heating is proportional to the electric power that is consumed by the resistance of a pixel sensor. Assuming that this power is $P_h$ [W], the heat conductance of the sensor is $G_t$, the heat capacity of the sensor is $C_t$, the time constant of the sensor is $\tau = C_t/G_t$, and the time elapsed from the start of energization is t, the temperature rise $dT_h$ due to self-heating at the elapsed time t is expressed by the following formula 1.

$$dT_h = \frac{P_h}{G_t} \cdot \left(1 - \exp\left(-\frac{t}{\tau}\right)\right) \quad (1)$$

In other words, the temperature rise expressed by the above formula 1 is added onto the signal as an offset. The approximate magnitude of this offset with respect to the actual signal can be estimated as follows. For example, it is assumed that with an image sensor having 320×240 pixels, an integrating amplifier 21 is arranged in each row, and signals of pixel sensors $P_m$ are read when connection is switched by switches $S_m$. In this case, the signals need to be read within 1/320 frame period, i.e., within 33 [ms]/320=about 100 [μs]. This requires the integration time s to be a value equal to or smaller than about 100 microseconds. With this time s, if τ is set to 1/3 of a frame, i.e., about 10 milliseconds, s/τ<<1. Accordingly, the integral of the above formula 1 can be given by the following formula 2 as an approximate expression.

$$\int dT_h = \frac{P_h}{G_t} \cdot \left(\frac{1}{2}\right) \cdot \frac{s^2}{\tau} \quad (2)$$

Meanwhile, assuming that the energy contributing heat generation of signals is $P_s$ [W] and the temperature rise thereof is $dT_s$, a term integrated for the signals with the time s is represented by the following formula 3.

$$\int dT_h = \frac{P_h}{G_t} \cdot s \quad (3)$$

Therefore, the resultant signal (total temperature rise) dT is represented by the following formula 4.

$$\int dT = \int dT_s + \int dT_h = \left(\frac{s}{G_t}\right) \cdot \left[P_s + P_h \cdot \left(\frac{s}{\tau}\right) \cdot \frac{1}{2}\right] \quad (4)$$

The second term in the brackets [ ] in the above formula 4 is the offset due to self-heating, and how large this is in comparison with the first term for the signals is important.

For example, when energy is concentrated with a lens having an f-number of 1.0 into a detector having a pixel size of 50 micrometers, infrared energy emitted by a person having a body temperature of 36° C. is on the order of several 10 nanowatts. When the resistance of the detector is 100 kΩ and a voltage of 2 volts is applied to both ends thereof, the electric power $P_h$ is represented by the following formula 5.

$$P_h = \frac{2 \cdot 2}{100 \times 10^3} = 40[uW] \quad (5)$$

If the integration time s is a maximum integration time of 100 microseconds, s/τ=0.01, and thus the offset is represented by the following formula 6.

$$\frac{P_h}{2} \cdot \frac{s}{\tau} = \frac{40 \times 0.01}{2} = 200[nW] \quad (6)$$

As represented in formula 6, this value is one digit larger than that of the energy $P_s$ contributing to heat generation, which cannot be ignored. The applied voltage or the resistance can be changed within a design range. However, reducing self-heating by the above-described method results in a reduction of current flowing in the detector, thereby reducing the electric power of the signals. This reduces the margin for other noises. Thus, the fact is that heat generation due to self-heating that is equivalent to the electric power of the signals cannot be avoided. After the release of energization, the temperature rise that has caused by self-heating becomes smaller with the same time constant τ, and the temperature rise after a time t seconds is expressed by the following formula 7.

$$dT = \frac{P_h}{G_t} \cdot \frac{s}{\tau} \cdot \exp\left(-\frac{t}{\tau}\right) \quad (7)$$

By contrast, as depicted in FIG. 8, in the infrared image sensor according to the present embodiment, pixel sensors are divided into odd-numbered and even-numbered groups and energized, whereby continuous energization is avoided and a heat dissipation period is secured. The integration time s of signals is set equal to or shorter than the time T that is obtained by dividing one frame period by the number of pixels plus two. This makes it possible to complete acquisition of odd-numbered differential signals $V_m$ and dummy energization (acquisition of the differential signal $V_0$) within the first-half frame period out of one frame period, and to start signal acquisition of the differential signal $V_2$ at the time ½ frame period later than the signal acquisition of the differential signal $V_1$. Assuming that this delay time is $T_d$, with respect to the time of starting acquisition of the differential signal $V_2$, energization the pixel sensor $P_1$ together with the reference sensor $P_0$ is started the delay time $T_d$ earlier to acquire the differential signal $V_1$ and energization thereto is completed a period of $T_d$-s earlier, and thus heat of the temperature rise due to self-heating of the pixel sensor $P_1$ is dissipated with the time constant τ for the period of $T_d$-s. Heat that cannot be dissipated this time can be calculated according to formula 7, and about 20% thereof remains as an offset.

In the acquisition of the differential signal $V_2$, the difference between the pixel sensor $P_1$ and the pixel sensor $P_2$ is acquired, and thus remaining heat of self-heating of the pixel sensor $P_2$ needs to be considered. Because energization to the pixel sensor $P_3$ is started a period of s later than the time of energization to the first pixel sensor $P_1$ to acquire the differential signal $V_3$ and energization thereto is completed in a period of 2·s, at the time of starting acquisition of the differential signal $V_2$, heat due to self-heating has been dissipated for a period of $T_d$-2·s. Although this heat dissipation period differs from that of the pixel sensor $P_1$ by the period of s, when the video rate in National Television System Committee (NTSC) is used, the delay time $T_d$ is about 16 milliseconds and s is equal to or shorter than 0.1 milliseconds, and thus the difference is very small and remaining heat of self-heating of the pixel sensor $P_2$ may be considered to be about 20%. Furthermore, when the differential signal $V_2$ is acquired, the difference between the pixel sensor $P_1$ and the pixel sensor $P_2$ is calculated, and thus the difference for the period of s can be omitted to cancel the remaining heat of self-heating. Note that in the conventional method in which all of the pixel sensors $P_m$ and the reference sensor $P_0$ are compared, even if the integration time s is shortened, the signal acquisition interval T cannot be shortened because it becomes impossible to dissipate heat of self-heating of the reference sensor $P_0$. By contrast, in the infrared image sensor according to the present embodiment, continuous energization to the same element is avoided, whereby the integration time s and the signal acquisition interval T can be set to the same value. Setting the integration time s and the signal acquisition interval T to the same value can make remaining heats of self-heating between two sensors closer. FIG. 8 is a diagram illustrating this self-heating cancelling mechanism.

The following describes the above-described cancelling mechanism with reference to formulas. The pixel sensor $P_1$ is initially energized to acquire the differential signal $V_1$, then this energization is turned off after the integration time s elapses, and heat dissipation is started. The offset due to self-heating after the energization is turned off is given by formula 7 and, when t of formula 7 has elapsed for $T_d$-s, the pixel sensor $P_1$ is energized again to acquire the differential signal $V_2$, and the temperature rise integrated for the integration time s is the offset of the signal. The magnitude of the offset is given by formula 8.

$$\int dT_{h1} = \int \frac{P_h}{G_t} \cdot \frac{s}{\tau} \cdot \exp\left(-\frac{t}{\tau}\right) dt \quad (8)$$
$$= \frac{P_h}{G_t} \cdot \frac{s}{\tau} \cdot \tau \cdot \left[\exp\left(-\frac{T_d - s}{\tau}\right) - \exp\left(-\frac{T_d}{\tau}\right)\right]$$
$$= \frac{P_h}{G_t} \cdot \frac{s^2}{\tau} \cdot \exp\left(-\frac{T_d}{\tau}\right)$$
$$= \frac{s}{G_t} \cdot \left[P_h \cdot \frac{s}{\tau} \cdot \exp\left(-\frac{T_d}{\tau}\right)\right]$$

Meanwhile, the pixel sensor $P_2$ that is energized simultaneously with the pixel sensor $P_1$ when the differential signal $V_2$ is acquired is energized a period of $T_d$-s earlier, and this energization is turned off a period of $T_d$-2·s earlier. The magnitude of the offset in this case is given by formula 9.

$$\int dT_{h2} = \int \frac{P_h}{G_t} \cdot \frac{s}{\tau} \cdot \exp\left(-\frac{t}{\tau}\right) dt \quad (9)$$
$$= \frac{P_h}{G_t} \cdot \frac{s}{\tau} \cdot \tau \cdot \left[\exp\left(-\frac{T_d - 2 \cdot s}{\tau}\right) - \exp\left(-\frac{T_d - s}{\tau}\right)\right]$$
$$= \frac{P_h}{G_t} \cdot \frac{s^2}{\tau} \cdot \exp\left(-\frac{T_d - s}{\tau}\right)$$
$$= \frac{s}{G_t} \cdot \left[P_h \cdot \frac{s}{\tau} \cdot \exp\left(-\frac{T_d - s}{\tau}\right)\right]$$

When the differential signal $V_2$ is acquired, this difference becomes the offset, and thus an offset that is superimposed on the final signal is given by the following formula 10.

$$\int dT_{off} = \int dT_{h1} - \int dT_{h2} \quad (10)$$
$$= \left(\frac{s}{G_t}\right) \cdot \left[P_h \cdot \left(\frac{s}{\tau}\right) \cdot \left\{\exp\left(-\frac{T_d}{\tau}\right) - \exp\left(-\frac{T_d - s}{\tau}\right)\right\}\right]$$
$$= -\left(\frac{s}{G_t}\right) \cdot \left[P_h \cdot \left(\frac{s}{\tau}\right) \cdot \exp\left(-\frac{T_d}{\tau}\right) \cdot \left(\frac{s}{\tau}\right)\right]$$

Herein, for comparison, the case in which differential signals between all of the pixel sensors $P_m$ and the reference signal $P_0$ are acquired will be described. Assuming that a period of time obtained by dividing one frame period by the number of pixels in one line is T, because pixels need to be read every period of T, self-heating occurs in the reference pixel $P_0$ due to energization every period of T. When considering the moment at which energization to a certain pixel is started, temperature rises at each time of a period of T earlier, a period of 2T earlier, a period of 3T earlier, . . . , and heat that is thus generated and cannot be dissipated remains as an offset $dT_{off}$. The offset $dT_{off}$ is expressed by the following formula 11.

$$dT_{off} = \frac{P_h}{G_t} \cdot \frac{s}{T} \quad (11)$$

In the above formula 11, approximation is made in which the period T is a period of time sufficiently shorter than τ. The integral of the offset in the integration time s is a value obtained by multiplying formula 11 by the time s. In the method in which differential signals between all of the pixel sensors $P_m$ and the reference sensor $P_0$ are acquired, the second term in the brackets [ ] given in formula 4 is deleted, but a term represented by formula 11 is newly added, and consequently the offset is represented by the following formula.

$$\int dT = \int dT_s + \int dT_{\mathit{off}} = \frac{s}{G_t} \cdot \left[ P_s + P_h \cdot \left( \frac{s}{T} \right) \right] \quad (12)$$

The method of the first embodiment (i.e., the method in which a differential signal between the reference sensor $P_0$ and the pixel sensor $P_1$ and differential signals between pixel sensors $P_m$ are used) and the method in which differential signals between all of the pixel sensors $P_m$ and the reference sensor $P_0$ are acquired will be compared. The term in the brackets [ ] for the offset given in formula 10 will be compared with the second terms in the brackets [ ] of formula 12 and formula 4 given in the other method. It is apparent that the term in the brackets [ ] for the offset given in formula 10 is smaller than the term for the offset given in formula 12. Furthermore, in the method of the first embodiment, when it is considered that the delay time $T_d$ is ½ frame period and τ is about ⅓ frame period, even if the integration time s is set to 100 microseconds, the offset is $\exp(-T_d/\tau) \times (s/\tau) \approx 0.22 \times 0.1$ [ms]/10 [ms]~0.0022. Accordingly, the resultant offset is $0.002 \times P_h \times (s/\tau)$, which is 1/250 of $0.5 \times P_h \times (s/\tau)$ given in formula 4.

As represented in formula 6, compared to incident energy of several 10 nanowatts upon a pixel for a signal from a person having a body temperature of 36° C., there is an offset of 200 nanowatts due to self-heating that cannot be ignored in formula 12. By contrast, in the infrared image sensor according to the first embodiment, the offset can be reduced to 1 nanowatt or lower. This offset is not particularly large to compress the dynamic range of the integrating amplifier 21, and thus can be sufficiently removed if it is acquired in advance as a calibration value.

Note that energization is performed twice including dummy energization to the reference sensor $P_0$ and the final pixel sensor $P_m$, but unlike the other pixels, this is not energization performed to adjacent pixels to each other. Accordingly, several percent of in-plane variations in characteristics may occur in semiconductor processes. However, dummy energization has a meaning only in performing energization, and it is important whether self-heating occurs under the same condition as that in acquiring signals. As seen from the difference circuit of the present embodiment, the voltage at the minus input of the integrating amplifier 21 to which sensors are connected is always $V_m = V/2$ because of imaginary short circuit. This maintains the voltage applied to both ends of an element to be the same regardless of which elements are connected to each other. Accordingly, when the reference sensor $P_0$ is connected with the pixel sensor $P_1$ and also when the reference sensor $P_0$ is connected to the final pixel sensor $P_m$, the amount of self-heating occurring is the same, and thus the self-heating cancelling mechanism of the present embodiment effectively works.

In the above-described example, the integration time s is set to 100 microseconds, and the maximum time interval T required to acquire signals of the respective pixels is set to the same 100 microseconds. The integration time s is preferred to be longer to obtain a better S/N ratio. However, if a certain level of margin is secured between other noises and the signals, the integration time s can be shortened. In the other method given by formula 4 and formula 12, the offset due to self-heating decreases in proportion to the length of the integration time s. By contrast, in the method according to the present embodiment, the offset decreases in proportion to the square of the integration time s as represented in formula 10.

As described above, with the infrared image sensor according to the present embodiment, using differential signals between pixels eliminates the necessity of comparing all of the pixels contained in the pixel region with one reference pixel, thereby making it possible to reduce the difference between the amount of self-heating of the reference pixel and the amount of self-heating of each of the pixels for detection. Accordingly, it is possible to maintain the sensitivity while sufficiently compensating for the amount of self-heating. In this manner, temperature changes due to self-heating can be compensated with hardware without reducing the aperture ratio, and a low cost and compact infrared camera can be fabricated.

In addition, with the infrared image sensor according to the first embodiment, the reference pixel is arranged at one end of at least one pixel line, whereby the reference pixel can be arranged so as not to influence the sensitivity of the infrared image sensor.

In addition, with the infrared image sensor according to the first embodiment, differential signals between adjacent pixels are used, whereby the influence of temperature changes in the use environment and the influence of variations in characteristics at different positions in an element formation surface can be reduced.

Second Embodiment

An infrared image sensor according to a second embodiment is configured approximately the same as the infrared image sensor according to the first embodiment, and differs in that a pixel sensor $P_{m+1}$ is arranged as a reference sensor adjacent to a pixel sensor $P_m$ and further a dummy reference sensor $P_d$ is arranged next to a pixel sensor $P_0$ or next to the pixel sensor $P_{m+1}$. Hereinafter, explanations for the same components as those of the infrared image sensor according to the first embodiment are omitted, and different points will be mainly described.

Figure 9:
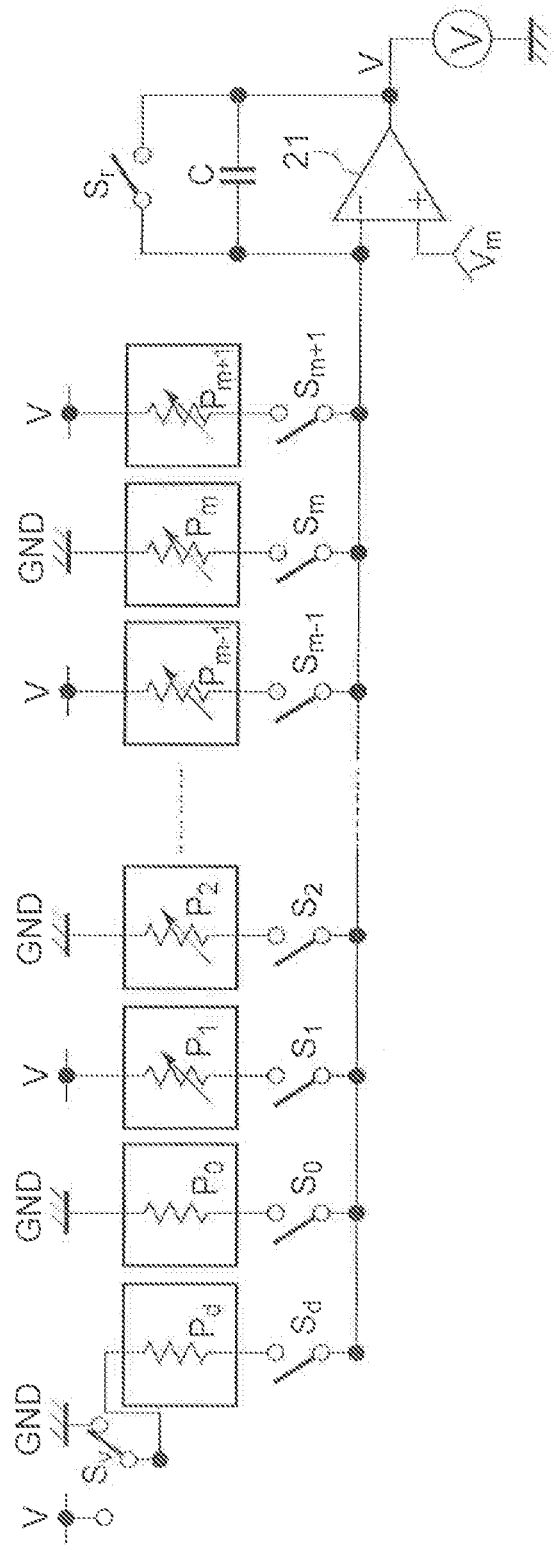
FIG. 9 is a circuit diagram of a difference detection circuit in each row of a light-receiving unit of an infrared image sensor according to a second embodiment.

Configuration of the infrared image sensor according to the present embodiment is the same as that of the infrared image sensor according to the first embodiment. FIG. 9 is a circuit diagram illustrating in detail a circuit (difference circuit) to the integrating amplifier 21 in each row of the light-receiving unit 12. As depicted in FIG. 9, one line portion of the light-receiving unit 12 is configured to include m+1 (m: an integer) pixel sensors $P_{m+1}$, one reference sensor $P_0$, one dummy reference sensor $P_d$, and switches $S_d$ and $S_{m+1}$ for connecting two predetermined pixel sensors $P_x$ and $P_y$ (x, y: integers) with the integrating amplifier 21. More specifically, this circuit is different from the circuit of the infrared image sensor according to the first embodiment in that the dummy reference sensor $P_d$ and the pixel sensor $P_{m+1}$ functioning as a reference sensor are added and in that one end of only the reference sensor $P_d$ is connected with the switch $S_d$ and the other end thereof is connected with the switch $S_y$, but is the same in other respects.

Figure 10:
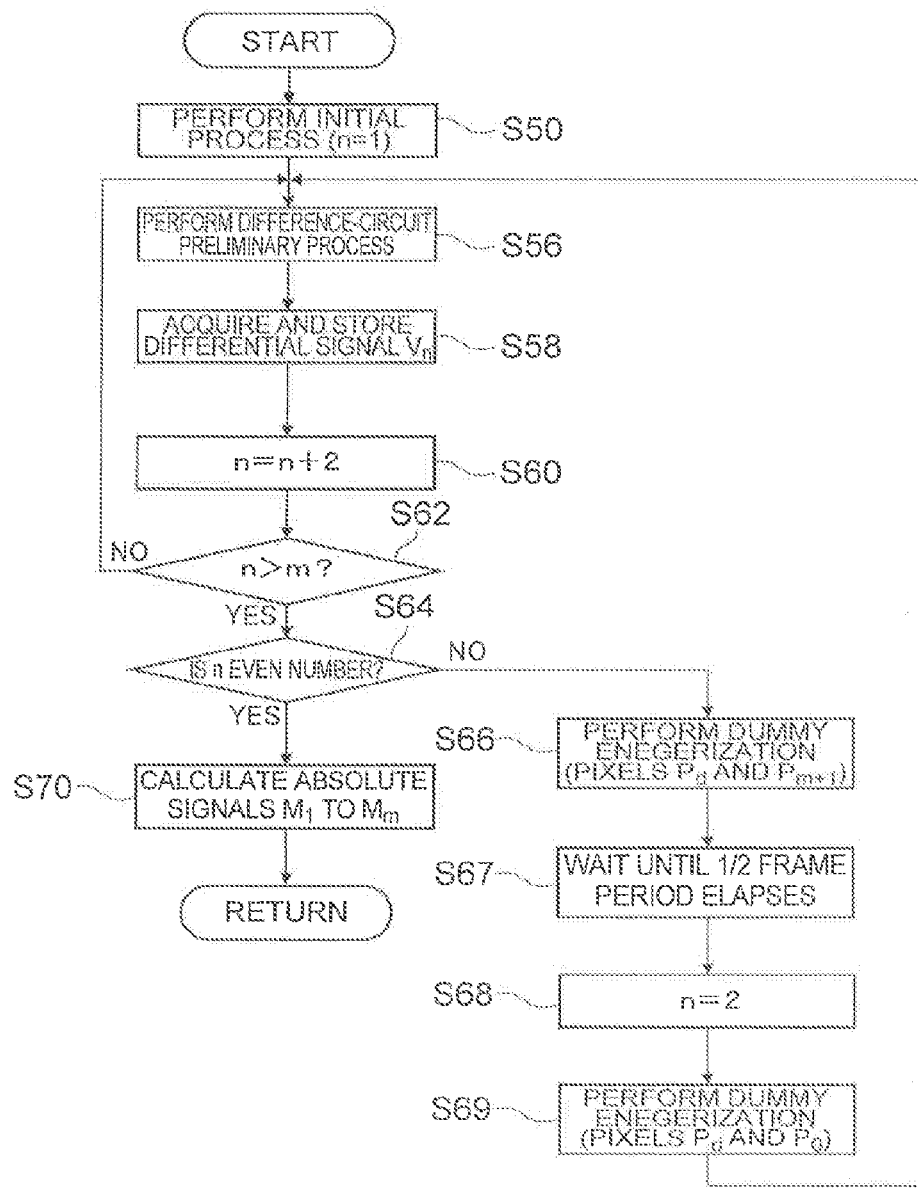
FIG. 10 is a flowchart for explaining a signal read operation of the infrared image sensor depicted in FIG. 9.

The following describes a signal acquisition operation of the infrared image sensor according to the present embodiment. FIG. 10 is a flowchart illustrating this second signal acquisition operation of the infrared image sensor according to the present embodiment. Control processes depicted in FIG. 10 are repeatedly performed at predetermined intervals from the timing when the power source of the infrared image sensor is turned on, for example. Note that the control processes depicted in FIG. 10 are performed by a control unit (not depicted) included in the infrared image sensor. For example, the control unit includes an arithmetic processor such as a CPU.

To begin with, the control unit performs an initial process (S50). The process at S50 is the same as the process at S10 in FIG. 5, and the control unit sets the count value n to one. Subsequently, the flow proceeds to a difference-circuit preliminary process (S56).

The process at S56 is the same as the process at S12, and the control unit discharges electric charge accumulated in the integrating capacitor C. When the process at S56 is completed, the flow proceeds to a differential signal acquisition/storage process (S58). The process at S58 is the same as the process at S14, and the control unit acquires and stores therein a differential signal $V_n$ in the integration time s. When the process at S58 is completed, the flow proceeds to a count process (S60).

In the process at S60, the control unit increments the count value n. Herein, the control unit adds two to the count value n. When the process at S60 is completed, the flow proceeds to a count-value determination process (S62).

The process at S62 is the same as the process at S18, and the control unit determines whether the count value n counted in the process at S60 is larger than the number of pixels m. In the process at S62, when the control unit determines that the count value n is not larger than the number of pixels m, the flow proceeds to the difference-circuit preliminary process (S56). Subsequently, the control unit acquires the (n+2)th differential signal V in the integration time s in the process at S58. In this manner, the control unit adds two to the count value each in the process at S60, and sequentially acquires differential signals such as $V_1$, $V_3$, $V_5$, and $V_{m-1}$, suffixes of differential signals V of which are odd numbers only until the count value n becomes larger than the number of pixels m. Note that the control unit performs this repetitive operation so that the operation can be completed within ½ frame period and inputs the differential signals thus acquired to the sample/hold circuit 22.

By contrast, in the process at S62, when the control unit determines that the count value n is larger than the number of pixels m, the flow proceeds to an even-number determination process (S64). In the process at S64, when the control unit determines that the count value n is not an even number, the flow proceeds to a dummy energization process (S66). In the process at S66, the control unit connects the dummy reference sensor $P_d$ and the pixel sensor $P_{m+1}$ depicted in FIG. 9. At this time, the control unit connects the switch $S_v$ to the GND. The process at S66 is a process performed to equalize the number of times the pixel sensor $P_{m+1}$ is energized and the number of times the other sensors are energized, and operation therein is merely for the purpose of energization. When the process at S66 is completed, the flow proceeds to a process for waiting until ½ frame elapses (S67). This process can delay the start of the latter half signal acquisition processes to the time when ½ frame has elapsed, thereby sufficiently dissipating heat from elements that have generated the heat in the first half signal acquisition. Subsequently, the flow proceeds to a count reset process (S68).

In the process at S68, the control unit sets the count value n to two. In other words, the control unit sets the count value n to start from an even number. When the process at S68 is completed, the flow proceeds to a dummy energization process (S69). In the process at S69, the control unit connects the dummy reference sensor $P_d$ and the reference sensor $P_0$ depicted in FIG. 9. At this time, the control unit connects the switch $S_v$ to the power source V. The process at S69 is a process performed to equalize the number of times the reference sensor $P_0$ is energized and the number of times the other sensors are energized, and operation therein is merely for the purpose of energization. When the process at S69 is completed, the flow proceeds to the difference-circuit preliminary process (S56). Then, the control unit acquires the differential signal $V_2$ in the process at S58, adds two to the count value n in the process at S60 and, in the process at S62, determines whether the count value n counted in the process at S60 is larger than the number of pixel m. In the process at S62, when the control unit determines that the count value n is not larger than the number of pixels m, the flow proceeds again to the difference-circuit preliminary process (S56). Then in the process at S58, the control unit acquires the (n+2)th differential signal V. In this manner, the control unit adds two to the count value each in the process at S60, and sequentially acquires differential signals such as $V_2$, $V_4$, $V_6$, and $V_m$, suffixes of differential signals V of which are even numbers only until the count value n becomes larger than the number of pixels m. By contrast, when the control unit determines that the count value n is larger than the number of pixels m in the process at S62, the control unit performs the even-number determination process (S64).

Differences between the processes described above so far and those of the first embodiment will be described. In the first embodiment, the pixel sensor $P_m$ and the reference sensor $P_0$ are connected for the purpose of energization, and thus energization thereto is performed twice. By contrast, in the present embodiment, the pixel sensor $P_m$ is connected with the pixel sensor $P_{m+1}$ being a reference sensor to acquire the difference signal $V_{m+1}$ between the pixel sensor $P_m$ and the pixel sensor $P_{m+1}$. Accordingly, the pixel sensor $P_m$ is energized twice when the differential signal $V_m$ is acquired and when the differential signal $V_{m+1}$ is acquired. This results in that the reference sensor $P_0$ and the pixel sensor $P_{m+1}$ are energized only once if additional energization is not performed, and accordingly two operations of dummy energization with the reference sensor $P_0$ and the dummy reference sensor $P_d$ connected and dummy energization with the pixel sensor $P_{m+1}$ and the dummy reference sensor $P_d$ connected are added so that self-heating is the same among all sensors. Although it is considered that the reference sensor $P_0$ and the pixel sensor $P_{m+1}$ are connected to make the number of times of energization to the reference sensor $P_0$ two, the above-described method is used to set the energization interval for all sensors to ½ frame period.

As described above, also in the present embodiment, signal acquisition processes are divided into a first half and a latter half, and acquisition of odd-numbered signals and acquisition of even-numbered signals are respectively performed therein. By performing the processes at S50 to S68, energization to the reference sensor $P_0$ for signal acquisition is performed at the start of the first half, and energization to the reference sensor $P_{m+1}$ is performed at the end of the latter half To perform energization to each of all sensors at regular intervals, dummy energization to the reference sensor $P_{m+1}$ is performed at the end of the first half, and dummy energization to the reference sensor $P_0$ is performed at the start of the latter half. For this energization, the dummy reference sensor $P_d$ is used. Note that if the reference sensor $P_d$ is not connected during dummy energization, all current flowing in the reference sensor $P_0$ or $P_{m+1}$ is flown into the integrating capacitor on the side of the amplifier, whereby the integrating amplifier 21 will be saturated. Although the voltage at the minus input of the integrating amplifier 21 is $V_m=V/2$ because of imaginary short circuit, if the integrating amplifier 21 is saturated, the imaginary short circuit does not work and consequently current flowing in the sensor will change. Accordingly, it is necessary to provide the dummy reference sensor $P_d$. However, if the current supply capacity of the integrating amplifier 21 is sufficiently large, the switch $S_r$ can be short circuited to avoid the integrating amplifier 21 from being saturated, whereby the dummy reference sensor $P_d$ can be omitted.

When the control unit determines that the count value n is larger than m in the process at S62, the flow proceeds to the even-number determination process (S64). In the process at S64, when the control unit determines that the count value n is an even number, the flow proceeds to the absolute signal calculation process (S70).

In the process at S70, the pixel signal calculating unit calculates absolute signals $M_m$, using differential signals $V_n$ acquired in the process at S58. Before the explanation of a calculation method for the absolute signals $M_m$, absolute image calculation formulas including the offset given by formula 10 in the first embodiment will be summarized first. It is assuming now that the offset $\int dT_{h1}$ given by formula 8 is $dM_1$ in a pixel that is initially energized and energized again after a period of $T_d$–s elapses, the offset $\int dT_{h2}$ given by formula 9 is $dM_2$ in a pixel that is energized next and is energized after a period of $T_d$–2·s elapses, and $dM_2-dM_1=dM$. In offsets of the respective pixels, even if there are variations in characteristics on the order of several percent in one line, the variations differ from dM obtained by subtraction by only several percent, and thus can be ignored in consideration of the fact that dM itself is small. In other words, the offsets dM in acquiring all signals can be considered to be the same. Accordingly, the differential signals $V_n$ can be expressed as follows.

$$V_1 = M_1 + dM_2 - (0 + dM_1) = M_1 + dM$$

$$V_2 = M_1 + dM_1 - (M_2 + dM_2) = M_1 - M_2 - dM$$

$$V_3 = M_3 + dM_2 - (M_2 + dM_1) = M_3 - M_2 + dM$$

$$V_4 = M_3 + dM_1 - (M_4 + dM_2) = M_3 - M_4 - dM$$

$$\vdots$$

$$V_m = M_{m-1} + dM_1 - (M_m + dM_2) = M_{m-1} - M_m - dM$$

Therefore, absolute values $M_x'$ are calculated as follows including the offset.

$$M_1' = M_1 + dM$$

$$M_2' = M_2 + 2 \cdot dM$$

$$M_3' = M_3 + 3 \cdot dM$$

$$\vdots$$

$$M_m' = M_m + m \cdot dM$$

More specifically, assuming that the number of pixels in one line is 320, the offset of the m-th pixel will be an offset that is 320 times as large as dM. When the integration time s is set to 100 microseconds in the example of the first embodiment, dM is 1/250 of the offset given by formula 4, but the offset of the m-th pixel obtained by multiplying this dM by 320 is obviously larger than the offset given by formula 4. This does not mean that the method performed by the infrared image sensor according to the first embodiment is unfavorable. This is because an offset detected by the integrating amplifier 21 is merely dM, which is smaller than the offset given by formula 4 by two digits or more. This does not compress the dynamic range of the integrating amplifier 21 or the A/D converter 24. The above-described offset obtained by multiplication by m is merely an arithmetic result on a calculator, and is a value that can be easily subtracted as a calibration value. Furthermore, because dM decreases with the square of the integration time s as described in the first embodiment, the offset can be sufficiently small simply by shortening the integration time s a little.

The following describes a method for cancelling self-heating according to the present embodiment performed in the process at S70. As described above, the pixel sensor $P_{m+1}$ functioning as a reference sensor is added next to the m-th one and a differential signal V between the pixel sensor $P_m$ and the pixel sensor $P_{m+1}$ is acquired, and the differential signal $V_{m+1}$ obtained at this time is also an absolute signal (first differential signal) similarly to the differential signal $V_1$. When the reference sensor $P_0$ is used alone, absolute signals M are obtained by adding and subtracting the differential signals $V_2$, $V_3$, $V_4$, ... in series from the differential signal $V_1$. In contrast, when the pixel sensor $P_{m+1}$ is added, the absolute signals of the respective pixel sensors can be obtained by addition and subtraction in the order from the m-th to the first pixels. Calculated values of absolute signals given in ascending order of suffixes and calculated values of absolute signals given in descending order of suffixes are summarized in the following formulas. In the order from 1 to m $$M_1' = M_1 + dM$$

$$M_2' = M_2 + 2 \cdot dM$$

$$M_3' = M_3 + 3 \cdot dM$$

$$\vdots$$

$$M_m' = M_m + m \cdot dM$$

In the order from m to 1

$$M_1'' = M_1 - m \cdot dM$$

$$M_2'' = M_2 - (m-1) \cdot dM$$

$$M_3'' = M_3 - (m-2) \cdot dM$$

$$\vdots$$

$$M_m'' = M_m - dM$$

Weighted averages are calculated by using these two sets of data. For example, assuming that $M_1'$ and $M_1''$ are weight-averaged with m and 1, respectively, to obtain an average value $M_1'''$, the result will be as follows.

$$M_1''' = \frac{M_1' \cdot m + M_1''}{m+1} = \frac{m \cdot M_1 + m \cdot dM + M_1 - m \cdot dM}{m+1} = (m+1) \cdot \frac{M_1}{m+1} = M_1$$

In this manner, on the formula, the offset due to self-heating can be completely deleted. Actually, because dM is not completely the same among all differential signals $V_m$, the offset cannot be completely deleted, but variations thereof are considered to be only several percent of dM as described above. Thus, it can be considered that the offset can be completely deleted in practical use. Accordingly, this method eliminates the necessity of regularly acquiring a calibration value. Completion of the process at S70 completes the control processes depicted in FIG. 10.

As described above, the control processes depicted in FIG. 10 are completed. By performing the control processes depicted in FIG. 10, differential signals between pixels can be acquired under conditions almost free from the influence of variations in semiconductor processes similarly to the case of performing the control processes depicted in FIG. 5, whereby offset generated by surrounding temperature changes can be almost eliminated.

In addition, by performing the control processes depicted in FIG. 10, the reference sensor $P_0$ and the pixel sensor $P_{m+1}$ are energized twice during one frame. Accordingly, the situation can be avoided in which self-heating becomes excessive only in the reference sensor $P_0$ and the pixel sensor $P_{m+1}$ by being connected with all pixel sensors and energized a plurality of times, and also the number of times the reference sensor $P_0$ and the pixel sensor $P_{m+1}$ are energized and the number of times the pixel sensors are energized can be equalized.

Furthermore, by performing the control processes depicted in FIG. 10, after odd-numbered differential signals V are acquired, even-numbered differential signals V are acquired. By this energization, a pixel sensor that has been energized once can be avoided from being energized continuously. In other words, a period of time for dissipating heat of self-heating can be secured, and thus differential signals can be acquired by using pixel sensors from which heat has been dissipated.

Furthermore, by performing the control processes depicted in FIG. 10, the offset given by formula 10 that cannot be canceled in the first embodiment can be canceled. This offset is acquired in advance as a calibration value, which can be subtracted from the actual image data. However, because the amount of self-heating varies with changes in the resistance of a sensor, if the surrounding temperature changes, the resistance of the detector itself changes, and also the offset changes. Thus, calibration value needs to be obtained regularly. Using the infrared image sensor according to the present embodiment can appropriately eliminate self-heating even if the offset changes.

In the first embodiment, when the integration time s is excessively shortened, energization interval to the reference sensor $P_0$ will deviate from ½ frame period. Although the other sensors are energized every ½ frame, only the reference sensor $P_0$ is energized when the differential signal $V_1$ is acquired and when the differential signal $V_0$ is acquired. Accordingly, when the integration time s is shortened, a period of time for the first-half signal acquisition becomes short, the energization timing for the differential signal $V_1$ becomes closer to that for the differential signal $V_0$, and consequently the time interval of energization only to the reference sensor $P_0$ will not be constant. By contrast, in the second embodiment, the dummy reference sensor $P_d$ is provided, dummy energization is performed at the end of the first half and at the first of the latter half, and accordingly energization can be performed at regular intervals to all sensors even if the integration time s is shortened As described above, with the infrared image sensor according to the second embodiment, functions and effects similar to those of the first embodiment can be obtained, surrounding temperature changes and temperature changes due to self-heating can be compensated with hardware without reducing the aperture ratio, and a low cost and compact infrared camera can be fabricated.

Furthermore, with the infrared image sensor according to the second embodiment, because therein reference pixels are arranged at both ends of at least one pixel line, the influence of self-heating can be further reduced by obtaining and averaging signals of pixels with two reference pixels used as references.

Third Embodiment

An infrared image sensor according to a third embodiment is configured approximately the same as the infrared image sensor according to the first embodiment, and differs in that a pixel sensor $P_b$ adjacent to a reference sensor $P_a$ (corresponding to the reference sensor $P_0$ of the infrared image sensor according to the first embodiment) is arranged, a dummy reference sensor $P_d$ is arranged next to the reference sensor $P_b$ or next to a pixel sensor $P_m$, and first ends of neighboring pixels are not connected to the power source V or the GND alternately, but instead every two pixels are connected to the power source V or the GND alternately. Hereinafter, explanations for the same components as those of the infrared image sensor according to the first embodiment are omitted, and different points will be mainly described.

Figure 11:
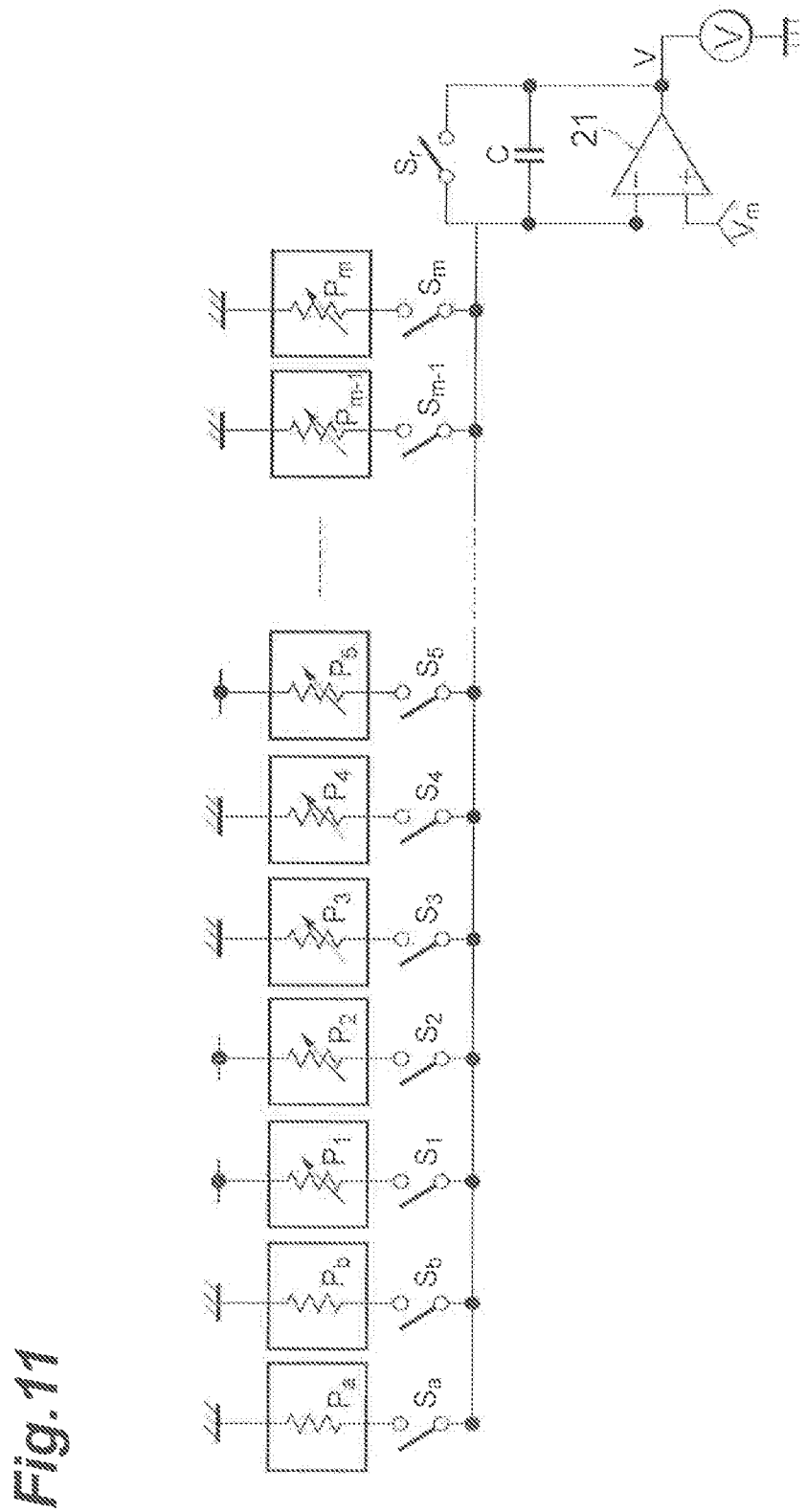
FIG. 11 is a circuit diagram of a difference detection circuit in each row of a light-receiving unit of an infrared image sensor according to a third embodiment.

Configuration of the infrared image sensor according to the present embodiment is the same as that of the infrared image sensor according to the first embodiment depicted in FIG. 1. FIG. 11 is a circuit diagram illustrating in detail a circuit (difference circuit) to the integrating amplifier 21 in each row of the light-receiving unit 12. As depicted in FIG. 11, one line portion of the light-receiving unit 12 is configured to include m (m: an integer) pixel sensors $P_m$, two reference sensors $P_a$ and $P_b$, one dummy reference sensor $P_d$ (not depicted), and switches $S_a$, $S_b$, and $S_m$ for connecting two predetermined pixel sensors $P_x$ and $P_y$ (x, y: integers, a, b) with the integrating amplifier 21. More specifically, this circuit is different from the circuit of the infrared image sensor according to the first embodiment in that the reference sensor $P_b$ and the dummy reference sensor $P_d$ are added and in that one end of only the dummy reference sensor $P_d$ is connected with the switch $S_d$ and the other end thereof is connected with the switch $S_r$. Furthermore, the reference sensors $P_a$ and $P_b$ and the pixel sensors $P_m$ are configured to be pairs each including two neighboring pixels, and connection destinations of first ends of pixels are different by pair. For example, the reference sensors $P_a$ and $P_b$, pixel sensors $P_1$ and $P_2$, pixel sensors $P_3$ and $P_4$, pixel sensors $P_5$ and $P_6$, . . . form pairs, and these pairs each are connected to the power source V or the GND alternately. In other words, the respective pairs are connected to the power source V or the GND alternately. This circuit is the same as that of the infrared image sensor according to the first embodiment in other respects. Similarly to the infrared image sensor according to the second embodiment, if the current supply capacity of the integrating amplifier 21 is sufficiently large, the dummy reference sensor $P_d$ may be omitted by short-circuiting the switch $S_r$ and performing energization thereto.

Figure 12:
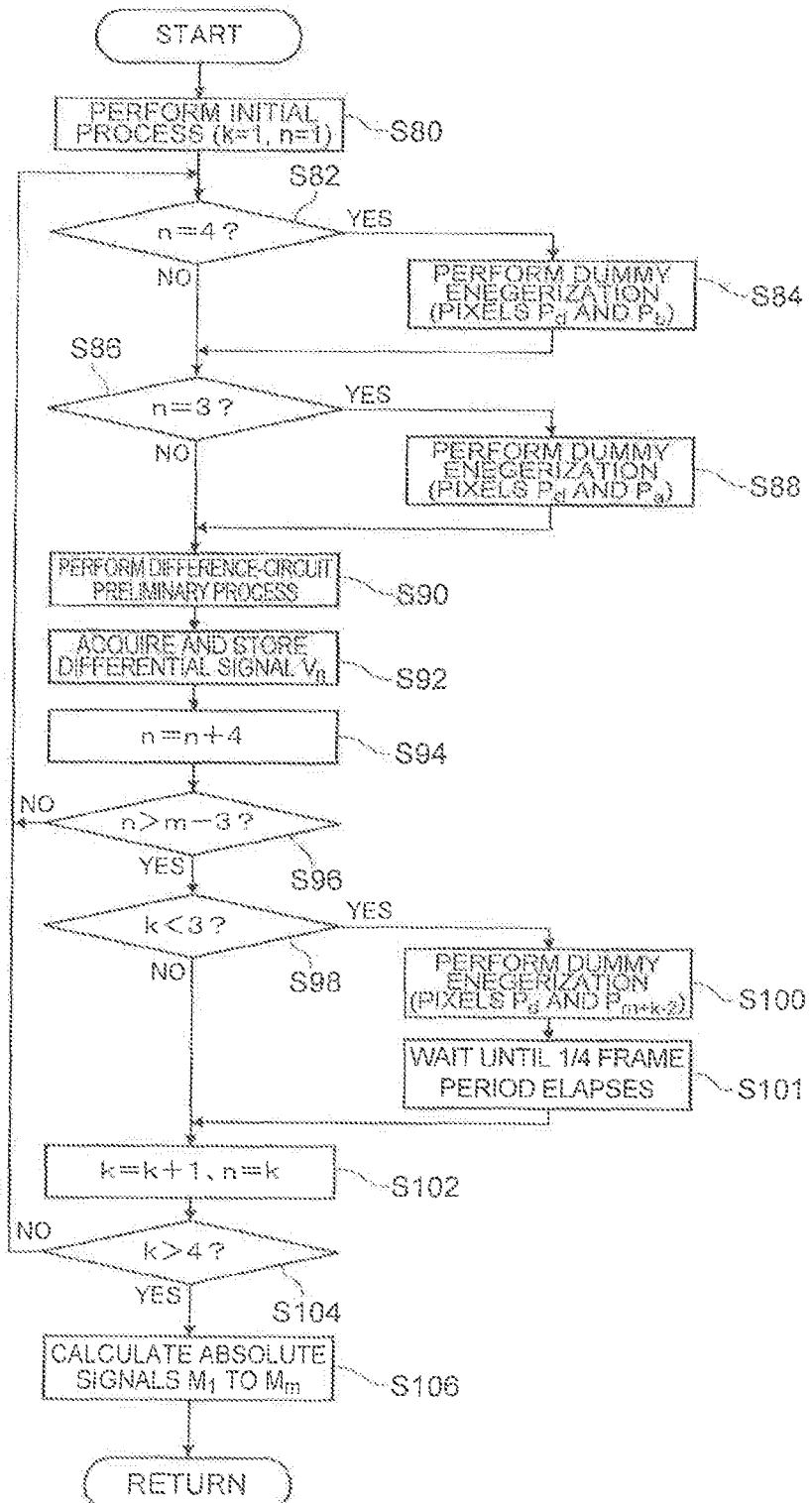
FIG. 12 is a flowchart for explaining a signal read operation of the infrared image sensor depicted in FIG. 11.

The following describes a signal acquisition operation of the infrared image sensor according to the present embodiment. FIG. 12 is a flowchart illustrating the signal acquisition operation of the infrared image sensor according to the present embodiment. Control processes depicted in FIG. 12 are repeatedly performed at predetermined intervals from the timing when the power source of the infrared image sensor is turned on, for example. Note that the control processes depicted in FIG. 12 are performed by a control unit (not depicted) included in the infrared image sensor. For example, the control unit includes an arithmetic processor such as a CPU.

To begin with, the control unit performs an initial process (S80). The process at S80 is approximately the same as the process at S10 in FIG. 5, and the control unit sets k to one and sets the count value n to k. This k defines the number of repetitions of processes and the number of a pixel sensor from which the repetitive processes are started. Subsequently, the flow proceeds to a count-value determination process (S82). In the process at S82, the control unit determines whether the count value n is four. When it is determined that the count value is not four in the process at S82, the flow proceeds to a count-value determination process (S86). In the process at S86, the control unit determines whether the count value n is three. When it is determined that the count value n is not three in the process at S86, the flow proceeds to a difference-circuit preliminary process (S90).

The process at S90 is the same as the process at S12, and the control unit discharges the electric charge accumulated in the integrating capacitor C. When the process at S90 is completed, the flow proceeds to a differential signal acquisition/storage process (S92). The process at S92 is approximately the same as the process at S14, and the control unit acquires and stores therein a differential signal $V_n$ in an integration time s. Note that when a differential signal $V_1$ is acquired, the pixel sensor $P_a$ and the pixel sensor $P_1$ are connected for acquisition. When a differential signal $V_2$ is acquired, the control unit connects the pixel sensor $P_b$ and the pixel sensor $P_2$ to acquire the differential signal. When a differential signal $V_n$ is acquired, the control unit connects a pixel sensor $P_{n-2}$ and a pixel sensor $P_n$ to acquire the differential signal. In this manner, the control unit connects each pair of alternate pixels instead of connecting neighboring pixels to acquire each differential signal. When the process at S92 is completed, the flow proceeds to a count process (S94).

In the process at S94, the control unit increments the count value n. Herein, the control unit adds four to the count value n. When the process at S94 is completed, the flow proceeds to a count-value determination process (S96).

The process at S96 is the same as the process at S18, and the control unit determines whether the count value n counted in the process at S94 is larger than m−3 obtained by subtracting three from the number of pixels m. In the process at S96, when the control unit determines that the count value n is not larger than m−3, the flow proceeds again to the count-value determination process (S82). In the process at S82, the control unit determines that the count value is not four, the flow proceeds to the process at S86 and, in the process at S86, the control unit determines that the count value is not three, the flow proceeds to the difference-circuit preliminary process (S90). Subsequently, the control unit acquires the (n+4)th differential signal V in the integration time s. In this manner, the control unit adds four to the count value each in the process at S94, and sequentially acquires only predetermined differential signals such as $V_1$, $V_5$, $V_9$, and $V_{m-3}$ until the count value n becomes larger than m−3.

By contrast, in the process at S96, the control unit determines that the count value n is larger than m−3, the flow proceeds to a repetition-count determination process (S98). In the process at S98, the control unit determines whether the number of repetitions k is smaller than three. In the process at S98, when the control unit determines that the number of repetitions k is smaller than three, the flow proceeds to a dummy energization process (S100).

In the process at S100, the control unit connects a pixel sensor $P_{m+k-2}$ depicted in FIG. 11 and the dummy reference sensor $P_d$ (not depicted). The process at S100 is a process performed to equalize the number of times the pixel sensor $P_{m+k-2}$ is energized and the number of times the other sensors are energized, and operation therein is merely for the purpose of energization. When the process at S100 is completed, the flow proceeds to a process for waiting until ¼ frame elapses (S101). This process can sufficiently dissipate heat from elements that have generated the heat in the previous signal acquisition. Subsequently, the flow proceeds to an increment process for the number of repetitions k (S102).

In the process at S102, the control unit increments the number of repetitions k and initializes the count value n. Herein, the control unit adds one to the number of repetitions k, and also sets the count value n to k. When the process at S102 is completed, the flow proceeds to a count-value determination process (S104).

In the process at S104, the control unit determines whether the number of repetitions k is larger than four. In the process at S104, when the control unit determines that the number of repetitions k is not larger than four, the flow proceeds again to the count-value determination process (S82). In the process at S82, when the control unit determines that the count value is four, the flow proceeds to the dummy energization process (S84).

In the process at S84, the control unit connects the reference sensor $P_b$ depicted in FIG. 11 and the dummy reference sensor $P_d$ (not depicted). The process at S84 is a process performed to equalize the number of times the reference sensor $P_b$ is energized and the number of times the other sensors are energized, and operation therein is merely for the purpose of energization. When the process at S84 is completed, the flow proceeds to the count-value determination process at S86 and, when the control unit determines that the count value n is not three, the flow proceeds to the difference-circuit preliminary process (S90). Subsequently, the control unit acquires the (n+4)th differential signal V in the integration time s in the process at S92, adds four to the count value each in the process at S94, and determines whether the count value is larger than m−3 in the process at S96. In this manner, the control unit adds four to the count value each, and sequentially acquires only predetermined differential signals V such as $V_2$, $V_6$, $V_{10}$, and $V_{m-2}$ until the count value n becomes larger than m−3.

By contrast, in the process at S96, when the control unit determines that the count value n is larger than m−3, the flow proceeds to the repetition-count determination process at S98 and, when the control unit determines that the number of repetitions k is smaller than three, the flow proceeds to the dummy energization process at S100, and then proceeds to the increment process for the number of repetitions k (S102). In the process at S102, the control unit adds one to the number of repetitions k and substitutes k into the count value n. Then in the process at S104, when the control unit determines that the number of repetitions k is not larger than four, the flow proceeds again to the count-value determination process (S82). In the process at S82, when the control unit determines that the count value n is not four, the flow proceeds to the count-value determination process at S86 and, when the control unit determines that the count value n is three, the flow proceeds to the dummy energization process (S88).

In the process at S88, the control unit connects the reference sensor $P_a$ depicted in FIG. 11 and the dummy reference sensor $P_d$ (not depicted). The process at S88 is a process performed to equalize the number of times the reference sensor $P_a$ is energized and the number of times the other sensors are energized, and operation therein is merely for the purpose of energization. When the process at S88 is completed, the flow proceeds to the difference-circuit preliminary process (S90). Subsequently, the control unit acquires the (n+4)th differential signal V in the integration time s in the process at S92, adds four to the count value each in the process at S94, and determines whether the count value is larger than m−3 in the process at S96. In this manner, the control unit adds four to the count value each, and sequentially acquires only predetermined differential signals V such as $V_3$, $V_7$, $V_{11}$, and $V_{m-1}$ until the count value n becomes larger than m−3.

By contrast, in the process at S96, when the control unit determines that the count value n is larger than m−3, the flow proceeds to the repetition-count determination process at S98 and, when the control unit determines that the number of repetitions k is not smaller than three, the flow proceeds the increment process for the number of repetitions k (S102). In the process at S102, the control unit adds one to the number of repetitions k and sets the count value to k. Then in the process at S104, when the control unit determines that the number of repetitions k is not larger than four, the flow proceeds again to the count-value determination process (S82). In the process at S82, when the control unit determines that the count value n is not four, the flow proceeds to the count-value determination process and, when the control unit determines that the count value n is not three, the flow proceeds to the difference-circuit preliminary process (S90). Subsequently, the control unit acquires the (n+4)th differential signal V in the integration time s in the process at S92. In this manner, the control unit adds four to the count value each in the process at S94, and sequentially acquires only predetermined differential signals V such as $V_4$, $V_8$, $V_{12}$, and $V_m$ until the count value n becomes larger than m−3.

By contrast, in the process at S96, when the control unit determines that the count value n is larger than m−3, the flow proceeds to the repetition-count determination process (S98). In the process at S98, the control unit determines whether the number of repetitions k is smaller than three. In the process at S98, the control unit determines that the number of repetitions is not smaller than three, the flow proceeds to the increment process for the number of repetitions k (S102).

In the process at S102, the control unit increments the number of repetitions k and initializes the count value n. The control unit herein adds one to the number of repetitions k and sets the count value n to k. When the process at S102 is completed, the flow proceeds to the count-value determination process (S104).

In the process at S104, the control unit determines whether the number of repetitions k is larger than four. In the process at S104, when the control unit determines that the number of repetitions k is larger than four, the flow proceeds to an absolute-signal calculation process (S106).

In the processes described above so far, the number of repetitions takes values from one to four, and the flow is as follows. To begin with, the control unit acquires the differential signal $V_1$ that is an absolute signal (first differential signal) between the reference sensor $P_a$ and the pixel sensor $P_1$. Next, the control unit connects the pixel sensor $P_3$ and the pixel sensor $P_5$ to acquire the differential signal $V_5$. Subsequently, the control unit connects the pixel sensor $P_7$ and the pixel sensor $P_9$ to acquire the differential signal $V_9$. The control unit performs repetitive operation in this manner to acquire differential signals up to $V_{m-3}$. Subsequently, the control unit acquires the differential signal $V_2$ that is an absolute signal (first differential signal) between the reference sensor $P_b$ and the pixel sensor $P_2$. Next, the control unit connects the pixel sensor $P_4$ and the pixel sensor $P_6$ for the differential signal $V_6$, connects the pixel sensor $P_8$ and the pixel sensor $P_{10}$ for the differential signal $V_{10}$, and performs repetitive operation in this manner to acquire differential signals up to $V_{m-2}$. Subsequently, the control unit connects the pixel sensor $P_1$ and the pixel sensor $P_3$ for the differential signal $V_3$, connects the pixel sensor $P_5$ and the pixel sensor $P_7$ for the differential signal $V_7$, and performs repetitive operation in this manner to acquire differential signals up to $V_{m-1}$. Finally, the control unit connects the pixel sensor $P_2$ and the pixel sensor $P_4$ for the differential signal $V_4$, connects the pixel sensor $P_6$ and the pixel sensor $P_8$ for the differential signal $V_8$, and performs repetitive operation in this manner to acquire differential signals up to $V_m$. Consequently, all pieces of pixel information in one line are acquired. Note that in the same manner as in the infrared image sensor according to the first embodiment, to equalize the energization interval and the number of times of energization for the reference sensors $P_a$ and $P_b$ and the pixel sensors $P_{m-1}$ and $P_m$ with those for the other sensors, the control unit performs dummy energization to the pixel sensor $P_{m-1}$ after acquisition of the differential signal $V_{m-3}$, dummy energization to the pixel sensor $P_m$ after acquisition of the differential signal $V_{m-2}$, dummy energization to the reference sensor $P_a$ before acquisition of the differential signal $V_3$, and dummy energization to the reference sensor $P_b$ before acquisition of the differential signal $V_4$.

Next, in the process at S106, the pixel signal calculating unit calculates absolute signals $M_m$ using the differential signals $V_n$ acquired in the process at S92. Because the offsets due to self-heating are the same as those in the first embodiment, formulas can be summarized as follows with some of them omitted for easy understanding.

$$(k = 1)$$
$$V_1 = M_1$$
$$V_5 = M_5 - M_3$$
$$V_9 = M_9 - M_7$$
$$\vdots$$
$$V_{m-3} = M_{m-3} - M_{m-5}$$
$$(k = 2)$$
$$V_2 = M_2$$
$$V_6 = M_6 - M_4$$
$$V_{10} = M_{10} - M_8$$
$$\vdots$$
$$V_{m-2} = M_{m-2} - M_{m-4}$$
$$(k = 3)$$
$$V_3 = M_1 - M_3$$
$$V_7 = M_5 - M_7$$
$$V_{11} = M_9 - M_{11}$$
$$\vdots$$
$$V_{m-1} = M_{m-3} - M_{m-1}$$
$$(k = 4)$$
$$V_4 = M_2 - M_4$$
$$V_8 = M_6 - M_8$$
$$V_{12} = M_{10} - M_{12}$$
$$\vdots$$
$$V_m = M_{m-2} - M_m$$

As described above, in the present embodiment, one line is divided into two, and two kinds of pixel information obtained with reference to the absolute signals based on the differential signal $V_1$ and pixel information obtained with reference to the absolute signals based on the differential signal $V_2$ are obtained, whereby one piece of image information is acquired. Completion of the process at S106 completes the control processes depicted in FIG. 12.

As described above, the control processes depicted in FIG. 12 are completed. In the first embodiment and the second embodiment, examples are described in which differential signals are acquired between neighboring pixels on one line (row) to reconstruct an image, but as described in the present embodiment, differential signals do not necessarily have to be acquired between neighboring pixels. The pixel size is often set to 20 to 50 micrometers and, in the case of using 20-micrometer pixels, even when difference is taken between a pair of alternate pixels, the distance between the pixels is at most 40 micrometers. This allows these methods be considered approximately the same in terms of environment for semiconductor processes. Accordingly, similarly to the first embodiment and the second embodiment, differential signals between pixels can be acquired under conditions almost free from the influence of variations in semiconductor processes, whereby offset generated by surrounding temperature changes can be almost eliminated.

In addition, by performing the control processes depicted in FIG. 12, the numbers of times respective pixel sensors are energized can be equalized among all pixel sensors, and also a pixel sensor that has been energized once can be avoided from being energized continuously. In other words, a period of time for dissipating heat of self-heating can be secured, and thus differential signals can be acquired by using pixel sensors from which heat has been dissipated.

Furthermore, the signal read method of the infrared image sensor according to the present embodiment can be expanded as follows. For example, the relationship between rows and columns may be exchanged so that differential signals between neighboring pixels in a column are used. Differential signals do not necessarily have to be acquired between neighboring pixels. An advantage of this method is that the offsets after arithmetic operations described in the first embodiment can be halved because the number of pixels can be equivalently reduced. Although respective pixels are connected alternately in the present embodiment, if one line is simply divided into two, signals may be acquired from the right half and the left half independently with reference sensors arranged at both ends as in the second embodiment. However, such a configuration cannot be expanded into the method of completely cancelling the offsets unlike in the case that the first embodiment is expanded into the second embodiment. Note that two additional reference sensors can be added to the right end of the pixel line of the infrared image sensor according to the present embodiment for improvement.

In this manner, by changing connection within a range in which sensor characteristics are considered to be the same, various variations of the present embodiment can be made. If characteristics are considered to be the same, it is possible to connect every two sensors and divide one line into three or four to acquire pieces of pixel information that are independent of one another. Another example is a method in which two lines are divided into the left half and the right half and two lines thus divided are connected to one integrating amplifier 21. In the left half of the upper line, adjacent sensors are connected to each other in the same manner as in the second embodiment, and a pixel sensor $P_{m/2}$ at the end of the left half is connected with a pixel sensor $P_{m/2}$ in the lower line. In the left half of the lower line, connection is made similarly to the upper line and, after turning around at the pixel sensor $P_{m/2}$, pixel sensors $P_{m/2-1}$, $P_{m/2-2}$, $P_1$ are sequentially connected, and finally the reference sensor in the lower line is connected. This is similar to the second embodiment with two lines that are turned around in the middle and are considered to be one line. At the right ends of the right half of the two lines, reference sensors are arranged, and signal processing is performed with another integrating amplifier 21. Note that a relationship of sensor characteristics between neighboring lines is equivalent to that between neighboring sensors on each of the lines, and thus the same processing can be performed even when neighboring lines are vertically connected.

As described above, with the infrared image sensor according to the third embodiment, functions and effects similar to those of the first embodiment and the second embodiment can be obtained, surrounding temperature changes and temperature changes due to self-heating can be compensated with hardware without reducing the aperture ratio, and a low cost and compact infrared camera can be fabricated. Furthermore, when a thermal image sensor is used for terahertz imaging, the signal level becomes almost one to two digit lower than that of a common thermal image sensor, requiring signal detection means having a high S/N ratio. By using the method according to the present embodiment in such an application, a high-sensitive camera can be fabricated.

Fourth Embodiment

An infrared image sensor according to a fourth embodiment is configured approximately the same as the infrared image sensor according to the third embodiment, and differs in that a pixel line includes a plurality of integrating amplifiers 21. Hereinafter, explanations for the same components as those of the infrared image sensors according to the first and third embodiments are omitted, and different points will be mainly described.

The infrared image sensor including the integrating amplifiers 21 in a pixel line is configured in two modes. A first example thereof includes a plurality of integrating amplifiers to improve the S/N ratio. With only one amplifier for one line, the integration time s cannot be set equal to or longer than the time T that is obtained by dividing one frame period by the number of pixels in the line. To improve the S/N ratio with the same sensitivity of the detector, the integration time s can be set longer by increasing the number of integrating amplifiers 21 for one line. In conventional techniques, a longer integration time s for an image sensor using a thermal detector makes the offset due to self-heating larger, thereby compressing the dynamic ranges of the integrating amplifiers 21 and the A/D converter 24. This cannot be practical means for improving the S/N particularly in conventional techniques. However, the methods described in the above embodiments make it possible to reduce the offset by two digits or more compared to conventional techniques. Accordingly, increasing the number of amplifiers is effective means for improving the S/N ratio. Note that making connections of pixel sensors described in the first embodiment and the second embodiment always requires subtractions of acquired signals, thereby cancelling the offset that the integrating amplifier 21 itself has, for example. Thus, even when a plurality of integrating amplifiers 21 are included, instead of performing arithmetic operations of differential signals acquired by different amplifiers for absolute signal calculation, arithmetic operations using differential signals may be performed with only outputs from one amplifier.

A first configuration according to the present embodiment is a configuration in which two integrating amplifiers 21 are used in the third embodiment described above. A set of differential signals $V_m$ with reference to the reference sensor $P_a$ and a set of differential signals with reference to the reference sensor $P_b$ are independently obtained in the third embodiment, and the different integrating amplifiers 21 are configured to integrate these sets of signals. This makes it possible to secure the integration time s twice as long as that in the case of one amplifier. Needless to say, as described in the second embodiment that is a modified version of the first embodiment, two reference sensors may be added to the right end of each pixel line of the infrared image sensor according to the present embodiment.

Figure 13:
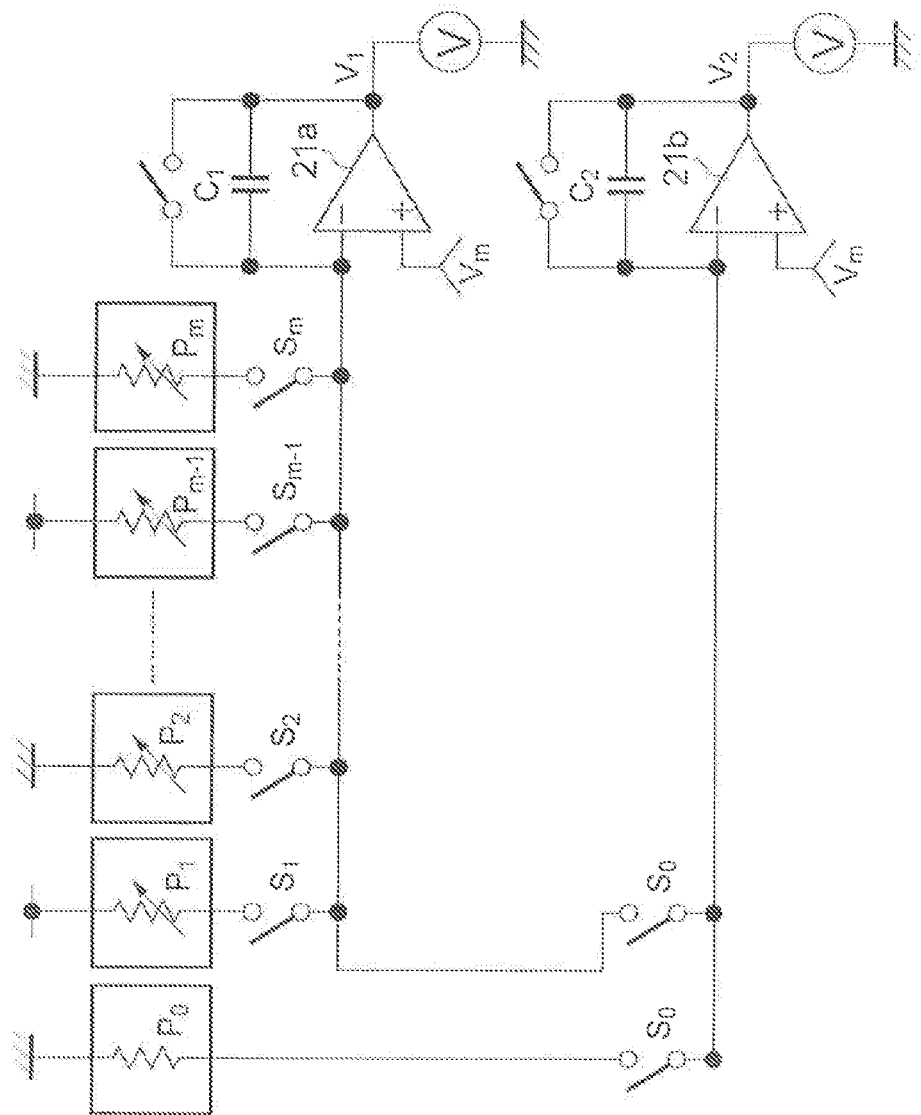
FIG. 13 is a circuit diagram of a difference detection circuit in each row of a light-receiving unit of an infrared image sensor according to a fourth embodiment.

FIG. 13 illustrates a second configuration according to the present embodiment. The second configuration aims to improve the resolution by providing the integrating amplifiers 21. FIG. 13 is a circuit diagram illustrating in detail a circuit (difference circuit) to the integrating amplifiers in each row of the light-receiving unit 12. As depicted in FIG. 13, the difference circuit of the infrared image sensor according to the present embodiment differs from the difference circuit of the infrared image sensor according to the third embodiment in including these integrating amplifiers 21a and 21b.

As depicted in FIG. 13, the differential circuit includes the integrating amplifier 21b for detecting difference between a pixel sensor $P_0$ and a pixel sensor $P_1$ for acquiring absolute signals and the integrating amplifier 21a for acquiring difference signals between pixels. As the integrating amplifier 21b, an amplifier having a gain that is different from that of the integrating amplifier 21a is used. As the A/D converter 24, an A/D converter having a high resolution may be used. In general thermal imaging, because rapid temperature change does not occur between neighboring pixels in reality, a wide dynamic range is not required for detecting differential signals between the pixels. Accordingly, increasing the gain to increase the signal strength is advantageous to the S/N ratio and also to the resolution.

However, a wide dynamic range and a high resolution of the A/D converter 24 are required for absolute signals. In the embodiments described above, because absolute signals and differential signals are acquired with one integrating amplifier 21 and the A/D converter 24, the dynamic range is determined by required specifications for acquisition of absolute signals and the conversion time of A/D conversion is determined by the number of pixels. In general, shortening the conversion time of the A/D converter 24 decreases the resolution thereof, and conversely lengthening the conversion time increases the resolution. Accordingly, in the present embodiment, the integrating amplifier 21a that is separately prepared for acquisition of absolute signals is connected with an A/D converter 24 on the side of absolute signal acquisition. For this A/D converter 24, a period of time that is longer than the period of time for acquiring differential signals between pixels can be assigned to the conversion time, whereby the resolution is increased. By contrast, for differential signals, a wide dynamic range is not required and thus an A/D converter 24 that has a low resolution and is high-speed type could be used.

It should be noted in the present embodiment that the integration time s can be lengthened to increase the S/N ratio when absolute signals are acquired. In this case, the same integration time s may be used to avoid a state in which the amount of self-heating differs from that of other pixels. Furthermore, also in the second configuration of the present embodiment, the offset due to self-heating can be cancelled by adding the pixel sensor $P_{m+1}$ that functions as a reference element as described in the second embodiment. In this case, the pixel sensor $P_{m+1}$ and the pixel sensor $P_m$ for differential signal detection are connected to the integrating amplifier 21b having a wide dynamic range.

As described above, with the infrared image sensor according to each example of the fourth embodiment, functions and effects similar to those of the first to third embodiments can be obtained, surrounding temperature changes and temperature changes due to self-heating can be compensated with hardware without reducing the aperture ratio, and a low cost and compact infrared camera can be fabricated.

Fifth Embodiment

An infrared image sensor according to a fifth embodiment is configured approximately the same as the infrared image sensors according to the first to fourth embodiments, and differs only in configuration of the amplifier portion. Hereinafter, explanations for the same components as those of the infrared image sensors according to the first to fourth embodiments are omitted, and different points will be mainly described.

Figure 14:
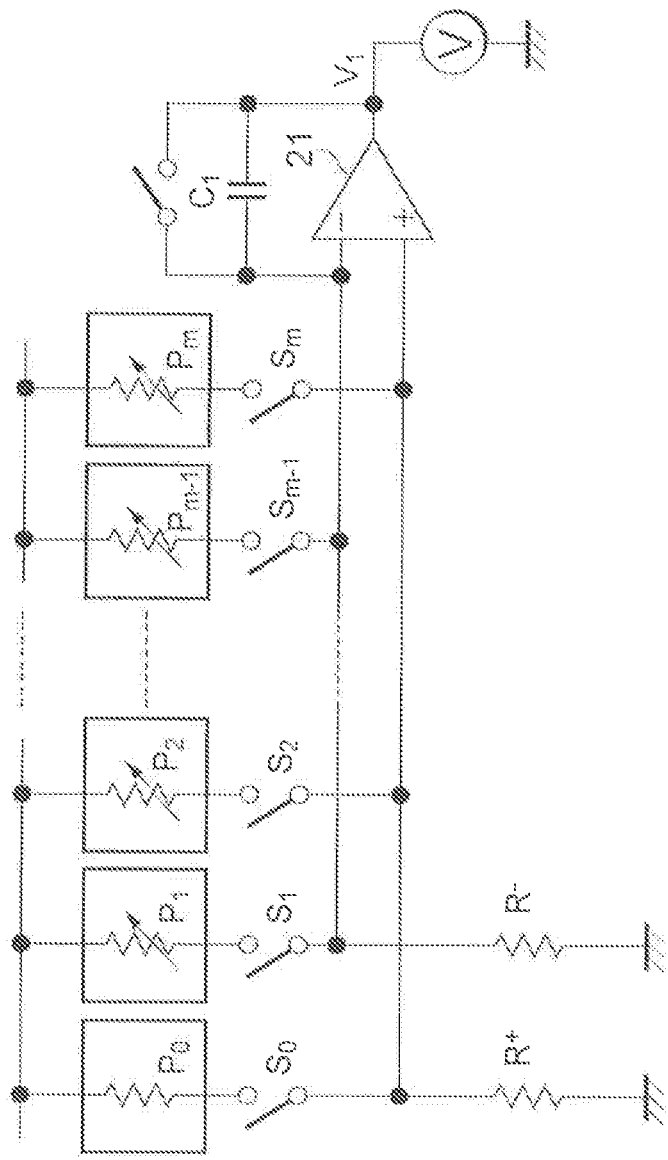
FIG. 14 is a circuit diagram of a difference detection circuit in each row of a light-receiving unit of an infrared image sensor according to one example of a fifth embodiment.

In the infrared image sensors according to the first to fourth embodiments, the methods have been described as examples in all of which a current-detecting-type integrating amplifier is used and adjacent sensors are connected, but differential signals can be acquired with other configurations. FIG. 14 illustrates one example of the infrared image sensor according to the fifth embodiment. As depicted in FIG. 14, a current-detecting-type integrating amplifier 21 is used similarly to the infrared image sensor according to the first embodiment, but the input of the integrating amplifier 21 is different. More specifically, instead of connecting adjacent pixel sensors to each other, switches $S_m$ are arranged so that even-numbered pixel sensors $P_{2n}$ including a reference sensor $P_0$ can be connected to the plus input of the integrating amplifier 21 and odd-numbered pixel sensors $P_{2n+1}$ can be connected to the minus input of the integrating amplifier 21, and the other ends of all pixel sensors are connected to the same voltage V. A resistance R− is connected to a line on the minus side of the integrating amplifier 21 and a resistance R+ is connected to a line on the plus side of the integrating amplifier 21. As the resistances R− and R+, resistances having exactly the same resistance value are used. The resistances R− and R+ do not have to be in the same structure as that of pixel sensors, and are configured so that self-heating does not occur by enhancing the thermal connection with a circuit board. The resistances R− and R+ may be resistances made of general metal having a thermal property such that property variation with temperature is small.

The following describes operation of the circuit depicted in FIG. 14. To begin with, a switch $S_0$ of the reference sensor $P_0$ is turned on, and a switch $S_1$ of a pixel sensor $P_1$ is turned on. At this time, the potential into which the voltage V is divided with the reference senor $P_0$ and the resistance R+ is applied to the plus input of the integrating amplifier 21. Because of the mechanism of imaginary short circuit of the integrating amplifier 21, the potential of this plus input appears at the minus input, and accordingly a current the same as that in the resistance R+flows in the resistance R− connected to the minus input. At this time, if infrared rays are not incident on the pixel sensor $P_1$ at all, the resistance value thereof becomes the same as that of the reference sensor $P_0$, and thus currents flowing therein are the same and the output at the integrating amplifier 21 becomes zero (actually, the same voltage as that of the plus input appears). If infrared rays have entered the pixel sensor $P_1$, the resistance value thereof is different from that of the reference sensor $P_0$, and thus the potential at the minus input cannot be equalized without causing a current different from that in the reference sensor $P_0$ to flow, which results in that a different current flows. The current flowing in the resistance R— is the same as that in the resistance R+, i.e., the current flowing in the reference sensor $P_0$, and consequently a differential current between the reference sensor $P_0$ and the pixel sensor $P_1$ will flow into the integrating capacitor C.

The above-described operation is exactly the same even when being applied to the first embodiment. Accordingly, the infrared image sensor according to the first to fourth embodiments can be constructed even when the amplifier configuration according to the present embodiment is applied thereto.

Because the resistances R− and R+ are made of material that facilitates heat conduction to the substrate and has a property such that property change due to temperature change is small, a problem of self-heating does not occur even if the resistances are used every time when a signal of each pixel is acquired. This eliminates the necessity of preparing the resistances R− and R+ for every pixel.

Furthermore, applying the above-described configuration allows the voltage applied to pixel sensors be optionally selected. Generally, the voltage that can be applied to the integrating amplifier 21 is limited. For example, the integrating amplifier 21 having a power source voltage of 5 volts has the upper limit of 5 volts. Because plus and minus variations occur in the output of the differential signal $V_m$, in the amplifier configurations of the infrared image sensors according to the first to fourth embodiments, the differential signal $V_m$ may be set to the center value of the power source voltage, i.e., 2.5 volts. This determines the voltage given to pixel sensors to be 5 volts. While the resistance value of the pixel sensors can be determined in design, determination of the power source voltage will be one limitation to the design. However, in the present embodiment, the values of the resistances R− and R+ can be optionally set, whereby flexibility is given to the voltage applied to the pixel sensors. For example, assuming that the resistance value of the pixel sensors is 100 kΩ, with the resistances R− and R+ each having a resistance value of 100 kΩ, the center voltage of operation of the integrating amplifier 21 will be 2.5 volts when the applied voltage is 5 volts. With the resistances R− and R+ each having a resistance value of 50 kΩ, the applied voltage can be increased to 7.5 volts while the center voltage of the operation at 2.5 volts is maintained. Increasing the applied voltage can improve the S/N ratio because thereby signal currents increase.

Figure 15:
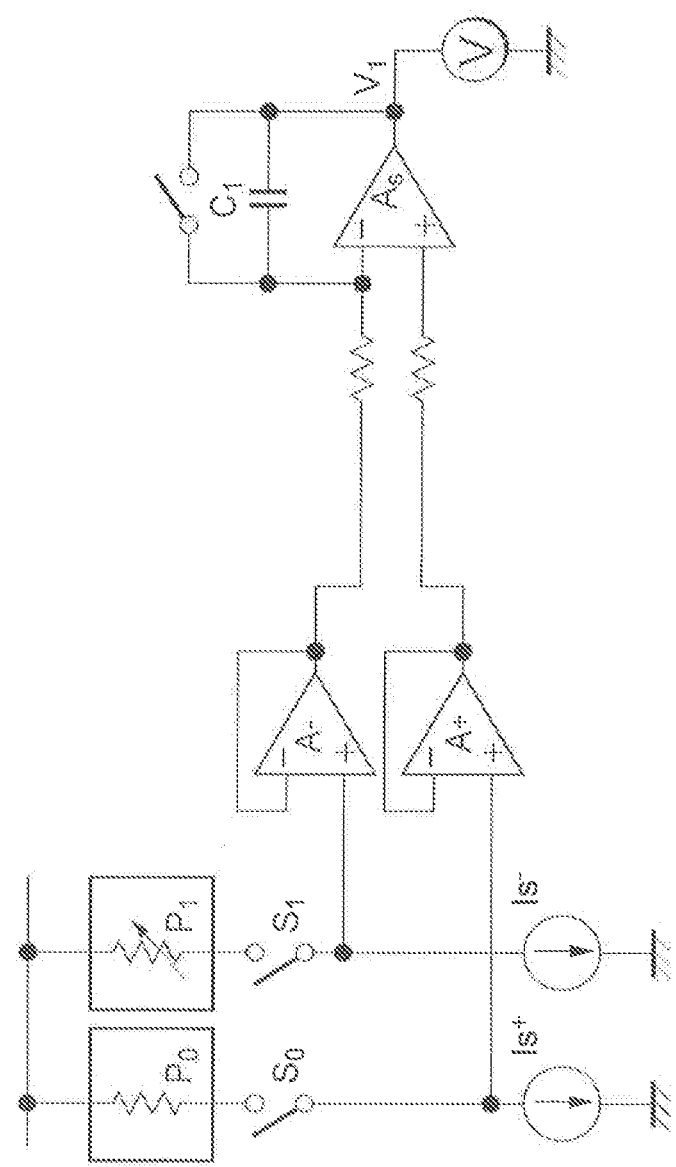
FIG. 15 is a circuit diagram of a difference detection circuit in each row of a light-receiving unit of an infrared image sensor according to another example of the fifth embodiment.

FIG. 15 illustrates another example of the infrared image sensor according to the present embodiment. As depicted in FIG. 15, the infrared image sensor according to the present embodiment has amplifier configuration of voltage-detecting-type. In FIG. 15, the arrangement of pixel sensors is the same as that in FIG. 14, and thus only the reference sensor $P_0$ and the pixel sensor $P_1$ are illustrated and other components are omitted for convenience of explanation and understanding.

As depicted in FIG. 15, one end of the reference sensor $P_0$ is connected to the voltage V. The reference sensor $P_0$ is also connected with a current source $I_{s+}$ in series via a switch $S_0$. This connecting point is connected with the plus input of an amplifier A+. One end of the pixel sensor $P_1$ is connected to the voltage V. The pixel sensor $P_1$ is connected with a current source $I_{s-}$ in series via a switch $S_1$. This connecting point is connected with the plus input of an amplifier A−. Both of the current sources $I_{s-}$ and $I_{s+}$ are current sources that cause the same constant current to flow. The amplifiers A− and A+ are buffer amplifiers. The output side of the amplifier A+ is connected to the plus input of an amplifier $A_s$, and the output side of the amplifier A− is connected to the minus input of the amplifier $A_s$. The amplifier $A_s$ is a circuit that calculates and integrates the difference between voltages of the amplifiers A− and A+.

Because the current sources $I_{s-}$ and $I_{s+}$ are current sources that cause the same constant current to flow, depending on the difference in resistance value between the reference sensor $P_0$ and the pixel sensor $P_1$, different potentials are applied to the plus inputs of the amplifier A− and the amplifier A+. The differential potential therebetween corresponds to the differential signal. Because the amplifiers A− and A+ are merely buffer amplifiers, the voltages applied the respective plus inputs of the amplifiers are output as outputs. Because the amplifier $A_s$ is a circuit for calculating and integrating the difference between the voltages of the amplifiers A− and A+, the differential signal between the reference sensor $P_0$ and the pixel sensor $P_1$ is obtained as a resultant output. Subsequently, by switching switches to acquire differential signals of the respective pixels, signals similar to those of the infrared image sensors of the first to fourth embodiments can be obtained. In other words, the above-described configuration can be applied to the first to fourth embodiments.

As described above, with the infrared image sensor according to each example of the fifth embodiment, functions and effects similar to those of the first to fourth embodiments can be obtained, surrounding temperature changes and temperature changes due to self-heating can be compensated with hardware without reducing the aperture ratio, and a low cost and compact infrared camera can be fabricated.

Note that each of the above-described embodiments represents one example of the infrared image sensor according to the present invention. The infrared image sensor according to the present invention is not limited to the infrared image sensors according to the respective embodiments, and may be an infrared image sensor obtained by modifying the infrared image sensors according to the respective embodiments or applying those to another infrared image sensor.

For example, the amplifier configurations described in the above embodiments are not limited to the above-described embodiments, and may have any kind of configuration as long as a differential signal between two sensors can be extracted. Furthermore, the pixel sensors are not limited to those of the bolometer type, and may be thermal detectors of thermopile type, for example.

Furthermore, explanations have been made in the above embodiments in which signals are acquired initially from the reference sensor $P_0$ and the pixel sensor $P_1$, but this order is not essential. For example, a case in which the absolute signal $V_1$ is initially acquired has been described in the first embodiment, but signal acquisition may be performed in such a manner that the pixel sensors are divided into even-numbered ones and odd-numbered ones, and also even-numbered differential signals are acquired in the first half and absolute signals thereof are acquired in the latter half. In this case, the time difference from the absolute signals will be ±½ frame period, which becomes shorter.

Furthermore, examples in which one pixel line includes at least one reference sensor $P_0$ have been described in the above embodiments, but it may be assumed that, for example, a plurality of pixel lines include at least one reference sensor $P_0$. In other words, a pixel region including a plurality of pixel lines may include at least one reference sensor $P_0$.

REFERENCE SIGNS LIST

1 . . . infrared image sensor, 12 . . . light-receiving unit

The invention claimed is:

1. An infrared image sensor for detecting infrared rays, the infrared image sensor comprising:
   a light-receiving unit including a pixel region in which a plurality of pixels are arranged and at least one reference pixel;
   a difference circuit for acquiring a first differential signal that is a differential signal between a signal of one pixel contained in the pixel region and a signal of the reference pixel and a second differential signal that is a differential signal between signals of two predetermined pixels out of the pixels contained in the pixel region; and
   a pixel signal calculating unit that calculates a signal of each of the pixels on the basis of the first differential signal and the second differential signal, wherein
   the two predetermined pixels are connected in series with respective first ends thereof connected to each other and also with respective second ends connected to different potentials, and
   the difference circuit acquires the second differential signal on the basis of a difference between a potential at the connecting point of the two predetermined pixels and a predetermined potential.

2. The infrared image sensor according to claim 1, wherein the pixel region includes at least one pixel line, and
   the reference pixel is arranged at one end of the at least one pixel line.

3. The infrared image sensor according to claim 1, wherein the pixel region includes at least one pixel line, and
   the reference pixel is arranged at each of both ends of the at least one pixel line.

4. The infrared image sensor according to claim 1, wherein the two predetermined pixels are adjacent pixels.

5. An infrared image sensor for detecting infrared rays, the infrared image sensor comprising:
   a light-receiving unit including a pixel region in which a plurality of pixels are arranged and at least one reference pixel;
   a difference circuit for acquiring a first differential signal that is a differential signal between a signal of one pixel contained in the pixel region and a signal of the reference pixel and a second differential signal that is a differential signal between signals of two predetermined pixels out of the pixels contained in the pixel region; and
   a pixel signal calculating unit that calculates a signal of each of the pixels on the basis of the first differential signal and the second differential signal,
   wherein
   the two predetermined pixels each are connected to different resistances in series with respective first ends thereof connected to the resistances and also with respective second ends connected to a same potential, and
   the difference circuit acquires the second differential signal on the basis of a difference between potentials at respective connecting points of the two predetermined pixels to the resistances.

6. The infrared image sensor according to claim 5, wherein the pixel region includes at least one pixel line, and
   the reference pixel is arranged at one end of the at least one pixel line.

7. The infrared image sensor according to claim 5, wherein the pixel region includes at least one pixel line, and
   the reference pixel is arranged at each of both ends of the at least one pixel line.

8. The infrared image sensor according to claim 5, wherein the two predetermined pixels are adjacent pixels.

9. A signal read method performed by an infrared image sensor including a light-receiving unit that includes a pixel region including at least one pixel line and two reference pixels arranged at one end of the pixel line, the signal read method comprising:
   a differential signal acquisition step of acquiring a first differential signal that is a differential signal between a signal of one pixel contained in the pixel region and a signal of each of the reference pixels and a second differential signal that is a differential signal between two predetermined signals out of a plurality of pixels contained in the pixel region; and
   a pixel signal calculation step of calculating a signal of each of the pixels on the basis of the first differential signal and the second differential signal, wherein
   at the differential signal acquisition step, the first differential signal and the second differential signal are acquired from a first reference pixel of the reference pixels as a starting point and then from adjacent pixels in series and also the first differential signal and the second differential signal are acquired from a second reference pixel of the reference pixels as a starting point and then from adjacent pixels in series and,
   at the pixel signal calculation step, a signal of each of the pixels is calculated based on the first differential signal and the second differential signal that are obtained with the first reference pixel as a starting point and also a signal of each of the pixels is calculated based on the first differential signal and the second differential signal that are obtained with the second reference pixel as a starting point, and based on two results thus calculated, a signal of each of the pixels is calculated.

* * * * *